United States Patent
Tamura et al.

(10) Patent No.: US 9,641,698 B2
(45) Date of Patent: May 2, 2017

(54) MOBILE COMMUNICATION NETWORK DISTRIBUTION SYSTEM AND MOBILE COMMUNICATION NETWORK DISTRIBUTION METHOD

(71) Applicant: NTT DOCOMO, INC., Chiyoda-ku (JP)

(72) Inventors: Motoshi Tamura, Chiyoda-ku (JP);
Shigeru Iwashina, Chiyoda-ku (JP);
Takahiro Yamazaki, Chiyoda-ku (JP);
Bunpei Yatsu, Chiyoda-ku (JP);
Tetsuya Nakamura, Chiyoda-ku (JP);
Takashi Shimizu, Chiyoda-ku (JP)

(73) Assignee: NTT DOCOMO, INC., Chiyoda-ku (JP)

( * ) Notice: Subject to any disclaimer, the term of this patent is extended or adjusted under 35 U.S.C. 154(b) by 31 days.

(21) Appl. No.: 14/406,589

(22) PCT Filed: Apr. 26, 2013

(86) PCT No.: PCT/JP2013/062446
§ 371 (c)(1),
(2) Date: Dec. 9, 2014

(87) PCT Pub. No.: WO2013/187144
PCT Pub. Date: Dec. 19, 2013

(65) Prior Publication Data
US 2015/0156336 A1   Jun. 4, 2015

(30) Foreign Application Priority Data

Jun. 15, 2012   (JP) ................................ 2012-135984

(51) Int. Cl.
*H04M 15/00*   (2006.01)
*H04W 48/18*   (2009.01)
(Continued)

(52) U.S. Cl.
CPC ....... *H04M 15/8055* (2013.01); *H04M 15/66* (2013.01); *H04M 15/8038* (2013.01);
(Continued)

(58) Field of Classification Search
CPC ......... H04W 8/08; H04W 8/18; H04W 28/08; H04W 28/02; H04W 28/0226;
(Continued)

(56) References Cited

U.S. PATENT DOCUMENTS

2008/0064403 A1\*   3/2008   Take ................ H04W 36/0083
455/436
2009/0213834 A1   8/2009   Amirijoo et al.
(Continued)

FOREIGN PATENT DOCUMENTS

EP   2 375 849 A1   10/2011
JP   2008 535340   8/2008
(Continued)

OTHER PUBLICATIONS

International Search Report Issued Jul. 16, 2013 in PCT/JP13/062446 Filed Apr. 26, 2013.
(Continued)

*Primary Examiner* — Erica Navar
(74) *Attorney, Agent, or Firm* — Oblon, McClelland, Maier & Neustadt, L.L.P.

(57) ABSTRACT

An object of the invention is to provide a communication service with high utilization efficiency. A mobile communication network distribution system includes: an acquisition unit that acquires condition information; a determination unit that determines a degenerate mobile communication network which provides a function satisfying a functional requirement based on the condition information acquired by the acquisition unit among a plurality of mobile communication networks to be a connection destination mobile
(Continued)

communication network which is a connection destination of the UE; and a distribution unit that distributes the connection destination of the mobile communication terminal to the connection destination mobile communication network determined by the determination unit.

7 Claims, 19 Drawing Sheets

(51) Int. Cl.
   *H04W 8/08* (2009.01)
   *H04W 76/02* (2009.01)
   *H04W 88/10* (2009.01)
   *H04W 92/14* (2009.01)
   *H04W 76/04* (2009.01)

(52) U.S. Cl.
   CPC ............. *H04W 8/08* (2013.01); *H04W 48/18* (2013.01); *H04W 76/022* (2013.01); *H04W 76/041* (2013.01); *H04W 88/10* (2013.01); *H04W 92/14* (2013.01)

(58) Field of Classification Search
   CPC ..... H04W 48/18; H04W 48/20; H04W 88/08; H04W 88/10; H04W 92/14; H04W 76/022; H04W 76/041; H04M 15/66; H04M 15/8038; H04M 15/8055
   USPC .............................................. 455/453, 435.2
   See application file for complete search history.

(56) References Cited

U.S. PATENT DOCUMENTS

| | | | | |
|---|---|---|---|---|
| 2009/0232013 | A1* | 9/2009 | Kumpula | H04K 3/65 370/252 |
| 2010/0222058 | A1* | 9/2010 | Pudney | H04W 36/24 455/435.2 |
| 2010/0234042 | A1* | 9/2010 | Chan | H04W 36/0061 455/453 |
| 2013/0303114 | A1* | 11/2013 | Ahmad | H04W 4/26 455/406 |

FOREIGN PATENT DOCUMENTS

| | | |
|---|---|---|
| JP | 2009 94812 | 4/2009 |
| JP | 2010-161478 A | 7/2010 |
| JP | 2012 80263 | 4/2012 |
| WO | WO 2006/114628 A2 | 11/2006 |
| WO | 2013 047822 | 4/2013 |

OTHER PUBLICATIONS

International Preliminary Report on Patentability and Written Opinion issued Dec. 24, 2014 in PCT/JP2013/062446 filed on Apr. 26, 2013.

Japanese Office Action issued Apr. 14, 2015 in Patent Application No. 2012-135984 (with English Translation).

Notification of Reasons for Refusal issued Jan. 5, 2016 in Japanese Patent Application No. 2012-135984 (with English language machine translation).

Extended European Search Report issued Mar. 2, 2016 in Patent Application No. 13803598.5.

"Addition of the use case: dedicated MTC network or dedicated MTC network elements" ZTE Corporation—3GPP TSG-SA WG1 Meeting #52, XP050464287, Nov. 2010, 2 Pages.

"Efficient small data transmission" Vodafone—SA WG2 Meeting #86, XP050548999, Jul. 2011, pp. 1-4.

"Monitoring, Event Notification and CN to MTC Server Interaction" Samsung—3GPP TSG SA WG2 Meeting #79, XP050434560, May 2010, pp. 1-5.

* cited by examiner

Fig. 16

FSW8-1

| Match Field | | | Output Action |
|---|---|---|---|
| INPUT PORT | TRANSMISSION SOURCE IP | DESTINATION IP | |
| FSW8 CONNECTION PORT | NOTHING⇒ IP ADDRESS OF UE8: A | NOTHING⇒ ADDRESS OF PDN-S8: ANY | NOTHING⇒REWRITE TRANSMISSION SOURCE ADDRESS FROM A TO C, AND OUTPUT TRANSMISSION SOURCE ADDRESS TO CONNECTION PORT TO PDN-S8 |
| FSW8 CONNECTION PORT | NOTHING⇒ ADDRESS OF PDN-S8: ANY | NOTHING⇒ IP ADDRESS OF UE8: C | NOTHING⇒REWRITE DESTINATION ADDRESS FROM C TO A OUTPUT PORT: P-GW8 CONNECTION PORT |

Fig. 17

(a) FSW8-2

| Match Field | | | Output Action |
|---|---|---|---|
| INPUT PORT | TRANSMISSION SOURCE IP | DESTINATION IP | |
| SP-GW8 CONNECTION PORT | NOTHING⇒ IP ADDRESS OF UE8:B | NOTHING⇒ ADDRESS OF PDN-S8:ANY | NOTHING⇒FSW8-1 CONNECTION PORT |
| FSW8-1 CONNECTION PORT | NOTHING⇒ ADDRESS OF PDN-S8:ANY | NOTHING⇒ IP ADDRESS OF UE8:B | NOTHING⇒SP-GW8 CONNECTION PORT |

(b) FSW8-1

| Match Field | | | Output Action |
|---|---|---|---|
| INPUT PORT | TRANSMISSION SOURCE IP | DESTINATION IP | |
| FSW8-2 CONNECTION PORT | NOTHING⇒ IP ADDRESS OF UE8:B | NOTHING⇒ ADDRESS OF PDN-S8:ANY | NOTHING⇒REWRITE TRANSMISSION SOURCE ADDRESS FROM B TO C AND OUTPUT TRANSMISSION SOURCE ADDRESS TO CONNECTION PORT TO PDN-S8 |
| PDN8 CONNECTION PORT | ADDRESS OF PDN-S8:ANY | IP ADDRESS OF UE8:C | NOTHING⇒REWRITE DESTINATION ADDRESS FROM C TO B OUTPUT PORT: P-GW8 CONNECTION PORT |

MOBILE COMMUNICATION NETWORK DISTRIBUTION SYSTEM AND MOBILE COMMUNICATION NETWORK DISTRIBUTION METHOD

TECHNICAL FIELD

The present invention relates to a mobile communication network distribution system and a mobile communication network distribution method which distribute a connection destination of a mobile communication terminal to one of a plurality of mobile communication networks.

BACKGROUND ART

In recent years, a third-generation mobile communication system (3G) defined by Third Generation Partnership Project (3GPP), which is a standardized project, or a Long Term Evolution (LTE) system corresponding to a so-called 3.9-generation mobile communication system (3.9G) has been used as a mobile communication system. In the mobile communication system, services are provided to a mobile communication terminal through a mobile communication network. For example, the following Patent Literature 1 discloses a system which performs a charging process corresponding to the result of usage of the services provided through the mobile communication network.

CITATION LIST

Patent Literature

[Patent Literature 1] Japanese Unexamined Patent Application Publication No. 2009-94812

SUMMARY OF INVENTION

Technical Problem

In the mobile communication network of the mobile communication system in which a network architecture and a control process are determined by 3GPP, services are provided to the mobile communication terminal through the network by a common control mechanism including, for example, mobility, QoS, and a charging process. That is, the mobile communication terminal is processed by the same mobile communication control. For this reason, excessive processing capability which is not necessarily required is given to mobile communication network resources according to the type of terminal, service conditions, and the state of the terminal. Examples of the excessive processing capability include a function of managing the position of an apparatus which is fixedly installed, a charge counting function related to a terminal which uses a flat rate system, and a function of managing the mobility of a terminal which stays at a home or an office and is not moved (mobility control function). There is a concern that, with an increase in the number of types of mobile communication terminals or services, the number of unnecessary functions will increase and the costs of mobile communication networks or the costs of providing services will increase due to a reduction in facility utilization efficiency.

The invention has been made in view of the above-mentioned problems and an object of the invention is to provide a mobile communication network distribution system and a mobile communication network distribution method which can provide a communication service with high utilization efficiency.

Solution to Problem

In order to achieve the above-mentioned object, according to an aspect of the invention, there is provided a mobile communication network distribution system that is provided in a mobile communication system that includes a mobile communication terminal and a plurality of mobile communication networks including a mobile communication network having functions that partially differ from another mobile communication network. The mobile communication network distribution system includes: acquisition means for acquiring condition information including at least one of information indicating a type of the mobile communication terminal, information indicating the content of a contract of the mobile communication terminal in the mobile communication system, information indicating a moving state of the mobile communication terminal, information indicating the content of a service which the mobile communication terminal requests from the mobile communication system, and information indicating a communication quality of the mobile communication network included in the mobile communication system; determination means for determining a mobile communication network that provides a function based on the condition information acquired by the acquisition means among the plurality of mobile communication networks to be a connection destination mobile communication network which is a connection destination of the mobile communication terminal; and distribution means for distributing the connection destination of the mobile communication terminal to the connection destination mobile communication network determined by the determination means.

In the mobile communication network distribution system according to the above-mentioned aspect of the invention, the condition information including at least one of the information indicating the type of mobile communication terminal, the information indicating the content of the contract of the mobile communication terminal in the mobile communication system, the information indicating the moving state of the mobile communication terminal, the information indicating the content of the service which the mobile communication terminal requests from the mobile communication system, and the information indicating the communication quality of the mobile communication network included in the mobile communication system is acquired. Then, the mobile communication network that provides the functions based on the acquired condition information among the plurality of mobile communication networks is determined to be the connection destination mobile communication network which is the connection destination of the mobile communication terminal. Then, the connection destination of the mobile communication terminal is distributed to the determined connection destination mobile communication network. Therefore, a mobile communication network having functions that partially differ from another mobile communication network and has high utilization efficiency is prepared and it is possible to distribute the connection destination of the mobile communication terminal to the mobile communication network on the basis of the condition information. As a result, for example, it is possible to prevent excessive processing capability from being given to the mobile communication network resources and facility utilization efficiency is improved. It is possible to suppress an increase in the costs of a mobile communication network and the costs of providing services. That is, it is possible to provide a communication service with high utilization efficiency and cost efficiency. In addition, since the connection destination of the mobile communication terminal is distributed to one of the plurality of mobile communication networks, it is possible to ensure the availability of services, for example, even when a failure or congestion occurs in some mobile communication networks.

The plurality of mobile communication networks may include a degenerate mobile communication network which is a mobile communication network that provides limited functions. The determination means may determine the degenerate mobile communication network that provides the functions based on the condition information acquired by the acquisition means among the plurality of mobile communication networks to be the connection destination mobile communication network. According to this structure, a degenerate mobile communication network which provides limited functions and has high cost efficiency is prepared and it is possible to distribute the connection destination of the mobile communication terminal to the degenerate mobile communication network on the basis of the condition information. Therefore, for example, it is possible to prevent excessive processing capability from being given to the mobile communication network resources. In addition, facility utilization efficiency is improved and it is possible to suppress an increase in the costs of a mobile communication network or the costs of providing services. That is, it is possible to provide a communication service with high utilization efficiency and cost efficiency.

The plurality of mobile communication networks may include a degenerate mobile communication network without a mobility management function. When it is determined that mobility management of the mobile communication terminal is not required on the basis of the condition information acquired by the acquisition means, the determination means may determine the degenerate mobile communication network without the mobility management function to be the connection destination mobile communication network. According to this structure, it is possible to distribute the connection destination of the mobile communication terminal to the degenerate mobile communication network without the mobility management function. Therefore, it is possible to provide a communication service with high utilization efficiency and cost efficiency.

The plurality of mobile communication networks may include a degenerate mobile communication network without a position management function. When it is determined that position management of the mobile communication terminal is not required on the basis of the condition information acquired by the acquisition means, the determination means may determine the degenerate mobile communication network without the position management function to be the connection destination mobile communication network. According to this structure, it is possible to distribute the connection destination of the mobile communication terminal to the degenerate mobile communication network without the position management function. Therefore, it is possible to provide a communication service with high utilization efficiency and cost efficiency.

The plurality of mobile communication networks may include a degenerate mobile communication network without a charging management function. When it is determined that charging management of the mobile communication terminal is not required on the basis of the condition information acquired by the acquisition means, the determination means may determine the degenerate mobile communication network without the charging management function to be the connection destination mobile communication network. According to this structure, it is possible to distribute the connection destination of the mobile communication terminal to the degenerate mobile communication network without the charging management function. Therefore, it is possible to provide a communication service with high utilization efficiency and cost efficiency.

The mobile communication network distribution system may further include location history storage means for storing a history of location information related to a location area of the mobile communication terminal. The determination means may determine whether the mobility management of the mobile communication terminal is required on the basis of the history of the location information stored by the location history storage means. According to this structure, it is possible to accurately suppose the moving state of the mobile communication terminal on the basis of the history of the location information related to the location area of the mobile communication terminal. Therefore, it is possible to appropriately distribute the connection destination of the mobile communication terminal to the degenerate mobile communication network without a mobility management function. As a result, it is possible to provide a communication service with high utilization efficiency and cost efficiency.

The mobile communication network included in the plurality of mobile communication networks may be constructed by a server virtualization technique. In the related art, for example, a dedicated hardware device is provided for each application for processing the communication service. Therefore, when a dedicated network which is customized for each terminal or each service type is constructed even though each terminal or each service type requires different functions, the size of the network is not sufficient, which is not appropriate in terms of costs and causes disadvantages due to large division loss. In contrast, according to the above-mentioned structure, the virtualization technique is applied to operate an application for processing the communication service on a general-purpose server and to construct the individual mobile communication network with a size suitable for each terminal or each service type. Therefore, it is possible to prevent the complexity of the network, unlike the related art, and to flexibly provide the availability of services according to the degree of importance. In addition, the application function of the communication service is customized to each terminal or each service type to remove a redundant process. Therefore, it is possible to provide a communication service with high utilization efficiency and cost efficiency. In addition, it is possible to dynamically install the system in a necessary place or to perform scaling according to the number of subscribers or the throughput of a service request which varies over time.

As described above, the invention can be described as the mobile communication network distribution system. In addition, the invention can be described as a mobile communication network distribution method. The mobile communication network distribution method and the mobile communication network distribution system belong to different categories, but are substantially the same. Therefore, the mobile communication network distribution method and the mobile communication network distribution system have the same operation and effect.

That is, according to another aspect of the invention, there is provided a mobile communication network distribution method that is performed by a mobile communication network distribution system provided in a mobile communication system that includes a plurality of mobile communication networks including a mobile communication network having functions that partially differ from another mobile communication network and a mobile communication terminal. The mobile communication network distribution method includes: an acquisition step of acquiring condition information including at least one of information indicating a type of the mobile communication terminal, information indicating the content of a contract of the mobile communication terminal in the mobile communication system, information indicating a moving state of the mobile communication terminal, information indicating the content of a service which the mobile communication terminal requests from the mobile communication system, and information indicating a communication quality of the mobile communication network included in the mobile communication system; a determination step of determining a mobile communication network that provides a function based on the condition information acquired in the acquisition step among the plurality of mobile communication networks to be a connection destination mobile communication network which is a connection destination of the mobile communication terminal; and a distribution step of distributing the connection destination of the mobile communication terminal to the connection destination mobile communication network determined in the determination step.

Advantageous Effects of Invention

It is possible to provide a communication service with high utilization efficiency.

BRIEF DESCRIPTION OF DRAWINGS

FIG. 16 is a diagram illustrating an example of a table stored by a flow switch in the eighth embodiment of the invention.

FIG. 17 is a diagram illustrating another example of the table stored by the flow switch in the eighth embodiment of the invention.

DESCRIPTION OF EMBODIMENTS

[Description of Terms]

Figure 1:
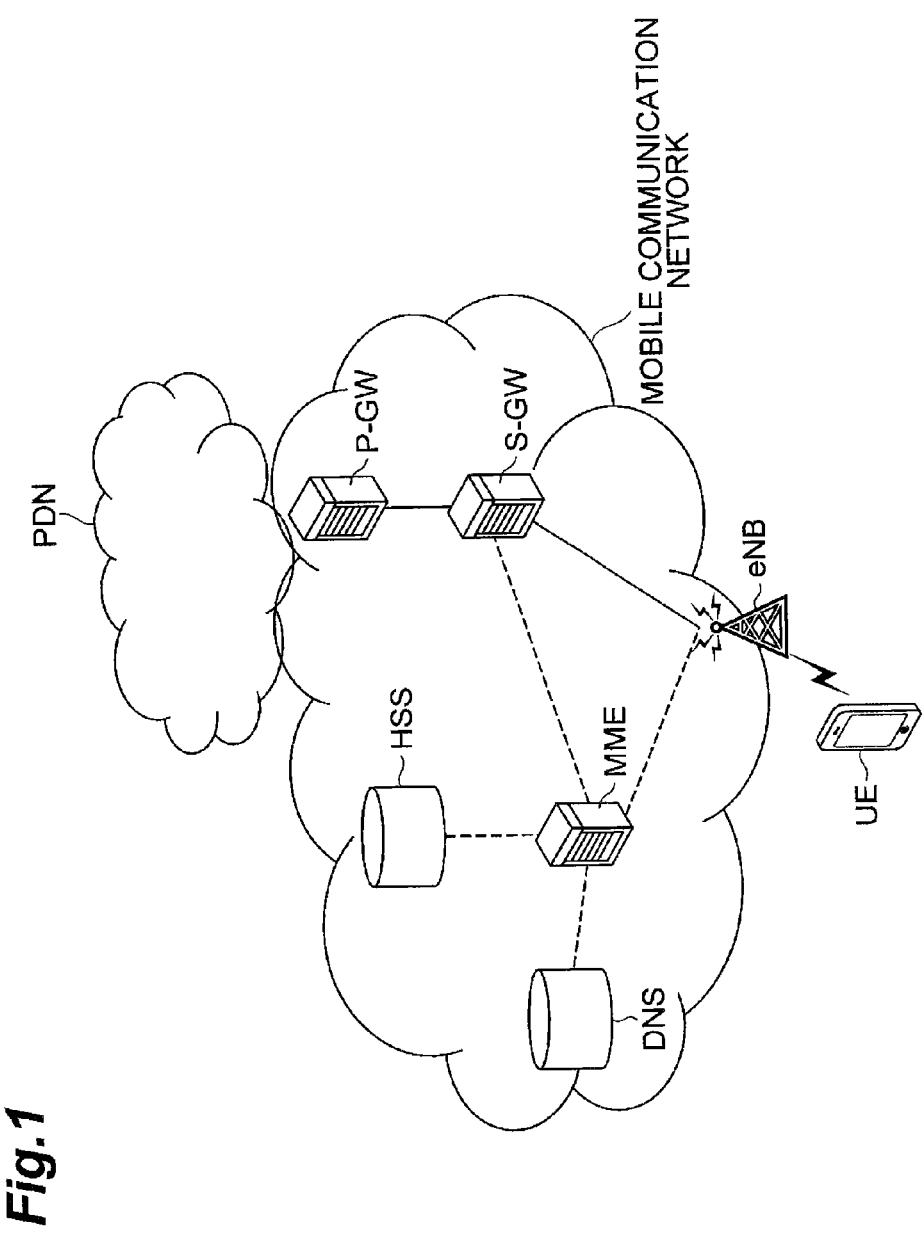
FIG. 1 is a diagram illustrating an attachment process according to the related art.

First, the terms of a mobile communication system according to an embodiment will be described. It is assumed that the terms which are not described in the following and are used in this embodiment are basically defined by 3GPP.

A "user equipment (UE)" is a mobile communication terminal and performs mobile communication in the mobile communication system. An "International mobile subscriber identity (IMSI)" is a mobile subscriber identifier for uniquely identifying a subscriber of the UE all over the world. An "international mobile equipment identity (IMEI)" is a unique mobile communication terminal identifier which is allocated to the UE and is set by the manufacturer of the UE. A "mobility management entity (MME)" is a mobility management control apparatus which performs a mobility management (mobility control) or bearer control process, such as a packet communication session (connection) setting and opening process or a handover control process. The bearer means a series of physical or logical paths for transmitting the communication information of a user. "Evolved node B (eNB)" is a so-called base station which has, for example, a radio resource management function, a mobility management function, a radio bearer control function, and a scheduling function, is connected to a core network, and transmits a user packet. A "home subscriber server (HSS)" is a subscriber information management apparatus which stores, for example, the profile information of subscribers. A "domain name server (DNS)" is a domain information management apparatus which manages the association between a domain name and an IP address.

A "packet data network (PDN)" is an external network, such as an IP service network of a communication service provider or public Internet. A "PDN gateway (P-GW)" is an external network gateway apparatus which functions as a connection point with the PDN and transmits a user packet to the PDN. A "serving gateway (S-GW)" is a routing gateway apparatus which provides a user packet routing function or a user packet transmission function. "Generic routing encapsulation (GRE)" is a general-purpose tunneling protocol and can encapsulate (tunnel) packets based on various protocols into an IP protocol. A "tunnel endpoint identifier (TEID)" is an identifier of a tunnel for transmitting the user packet. A "global unique temporary identity (GUTI)" is a temporary terminal identifier which is allocated from an MME to a UE. "S1-Flex" is technology in which a single eNB is connected to a plurality of MMEs or S-GWs to equalize a load and to improve reliability.

"Attachment" means establishing a communication path to a corresponding P-GW according to the address of the PDN designated by a mobile communication terminal (in general, when power is turned on) (the address of a default PDN, which will be described below, is used when the mobile communication terminal does not designate the address of the PDN). A TEID tunnel which is set when communication is temporarily interrupted is opened (preservation). "Detachment" means opening the established communication path from the mobile communication terminal to the P-GW when the power of the mobile communication terminal is switched.

"Position registration" means the registration of a position in the MME and the registration of the position in the HSS through the MME when the mobile communication terminal is laid across position registration area groups. The MME stores the position registration area group including the mobile communication terminal and the HSS stores the MME to which the mobile communication terminal is attached. A "general PDN" means a PDN (for example, Internet connection) which is explicitly designated by the mobile communication terminal. A "default PDN" means a PDN which is used when the mobile communication terminal is connected without designating a PDN. The default PDN is set to the HSS for each subscriber (IMSI). "Transmission of a signal" means connection in a constant connection state (or a reset state when the TEID tunnel is opened by preservation) when there is an attached PDN and connection to the PDN by the same process as the attachment process (except for a position registration process) when the PDN is not connected.

[Attachment Process According to the Related Art]

Next, an attachment process according to the related art will be described with reference to a mobile communication system shown in FIG. 1. The mobile communication system shown in FIG. 1 includes a UE, a core network, and a PDN. The core network includes an eNB, an MME, an HSS, a DNS, an S-GW, and a P-GW. In the attachment process which will be described below, process numbers are given in order of processes.

1. When the UE is turned on, the UE transmits, to the eNB, an attachment signal which includes IMSI (and IMEI) and designates the address of the PDN.

2. The eNB transmits the signal to the MME to which the eNB belongs (any one of the MMEs to which the eNB belongs, in the case of S1-Flex).

3. When receiving the attachment signal, the MME receives authentication information from the HSS and performs authentication, concealing, and integrity processes for the UE.

4. The MME transmits a position registration signal to the HSS and the HSS controls the UE. The HSS registers the MME and returns the domain information of the default PDN to the MME when the UE does not designate the address of the PDN.

5. The MME transmits the domain information of the PDN, which is a connection destination, to the DNS and receives the addresses of the S-GW and the P-GW corresponding to the address of the PDN as a response.

6. The MME transmits a bearer setting request which is directed to the P-GW to the S-GW, using the received address. The S-GW transmits a path setting request to the P-GW.

7. When receiving the path setting request, the P-GW outputs an IP address to the UE and establishes a GRE tunnel between the S-GW and the P-GW.

8. The MME notifies the UE of the IP address output from the P-GW and GUTI as a temporary identifier of the UE allocated by the MME to establish a wireless data bearer and notifies the eNB of the address of the S-GW to establish a TEID tunnel between the eNB and the S-GW.

9. In this way, a communication path from the UE to the P-GW is established.

10. Thereafter, the UE uses the GUTI as the identifier, instead of the IMSI.

Figure 2:
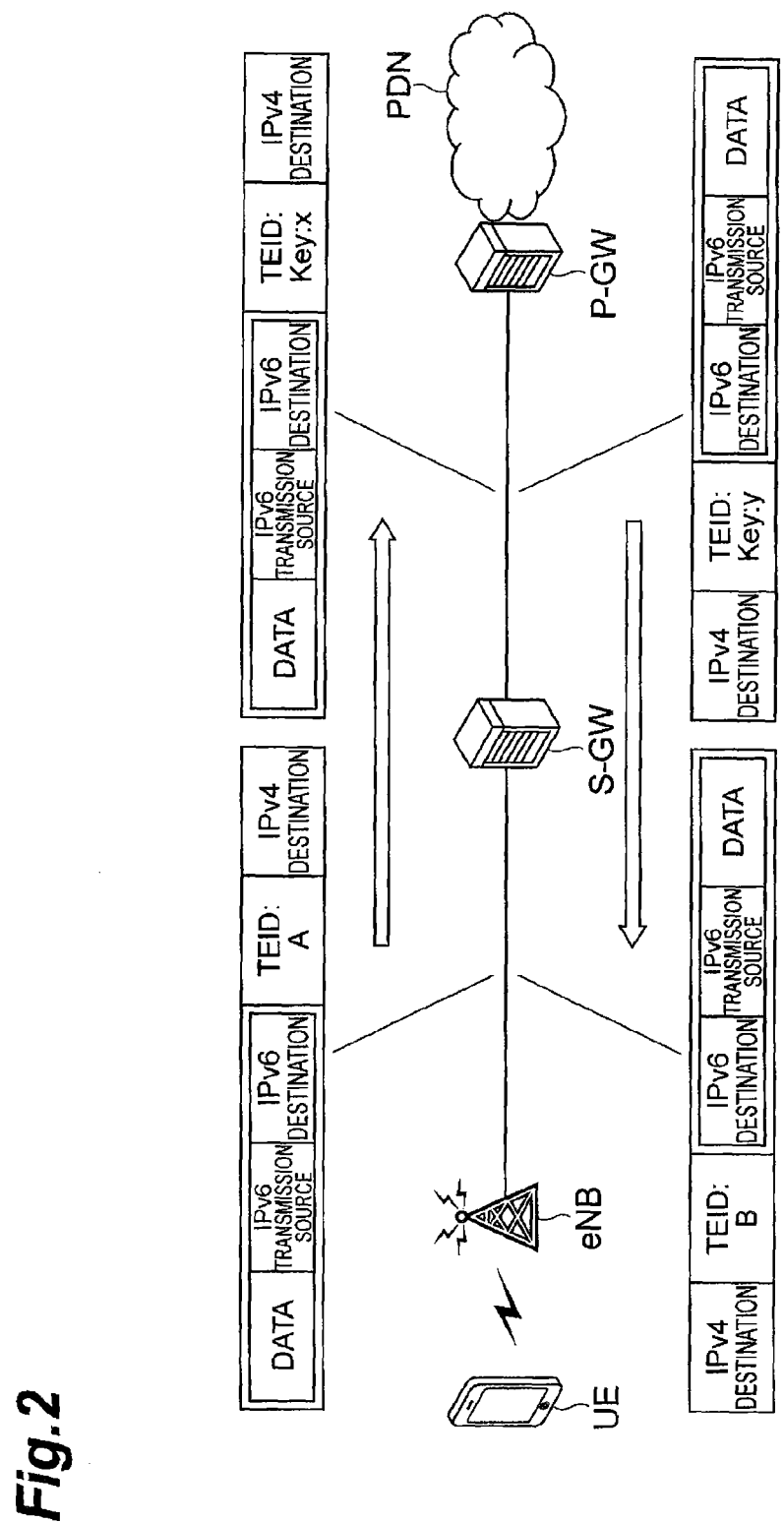
FIG. 2 is a diagram illustrating the content of a packet which flows through a GRE tunnel and a TEID tunnel.

FIG. 2 is a diagram illustrating the content of IP packets which flow through the TEID tunnel and the GRE tunnel. In FIG. 2, the TEID tunnel is established between the eNB and the S-GW and the GRE tunnel is established between the S-GW and the P-GW.

[Detachment Process According to the Related Art]

Next, a detachment process according to the related art will be described with reference to the mobile communication system shown in FIG. 1. In the following detachment process, process numbers are given in order of processes.

1. When the power of the UE is switched, the UE transmits a detachment signal to the MME which controls the UE through the eNB (the eNB distinguishes the MME on the basis of the GUTI included in the detachment signal).

2. When receiving the detachment signal, the MME transmits a bearer cutting request to the S-GW. The S-GW opens the settings of the TEID tunnel established between the eNB and the S-GW and returns a bearer cutting request response to the MME.

3. The MME receives the bearer cutting request response and instructs the eNB to open the TEID and a radio data link.

4. The S-GW transmits a path cutting request including the IP address of the UE to the P-GW. When receiving the path cutting request, the P-GW cancels the allocation of the IP address of the UE and opens the GRE tunnel between the S-GW and the P-GW.

5. The MME cancels the GUTI allocated to the UE.

6. In this way, the communication path from the UE to the P-GW is opened.

[Position Registration Process According to the Related Art]

Figure 3:
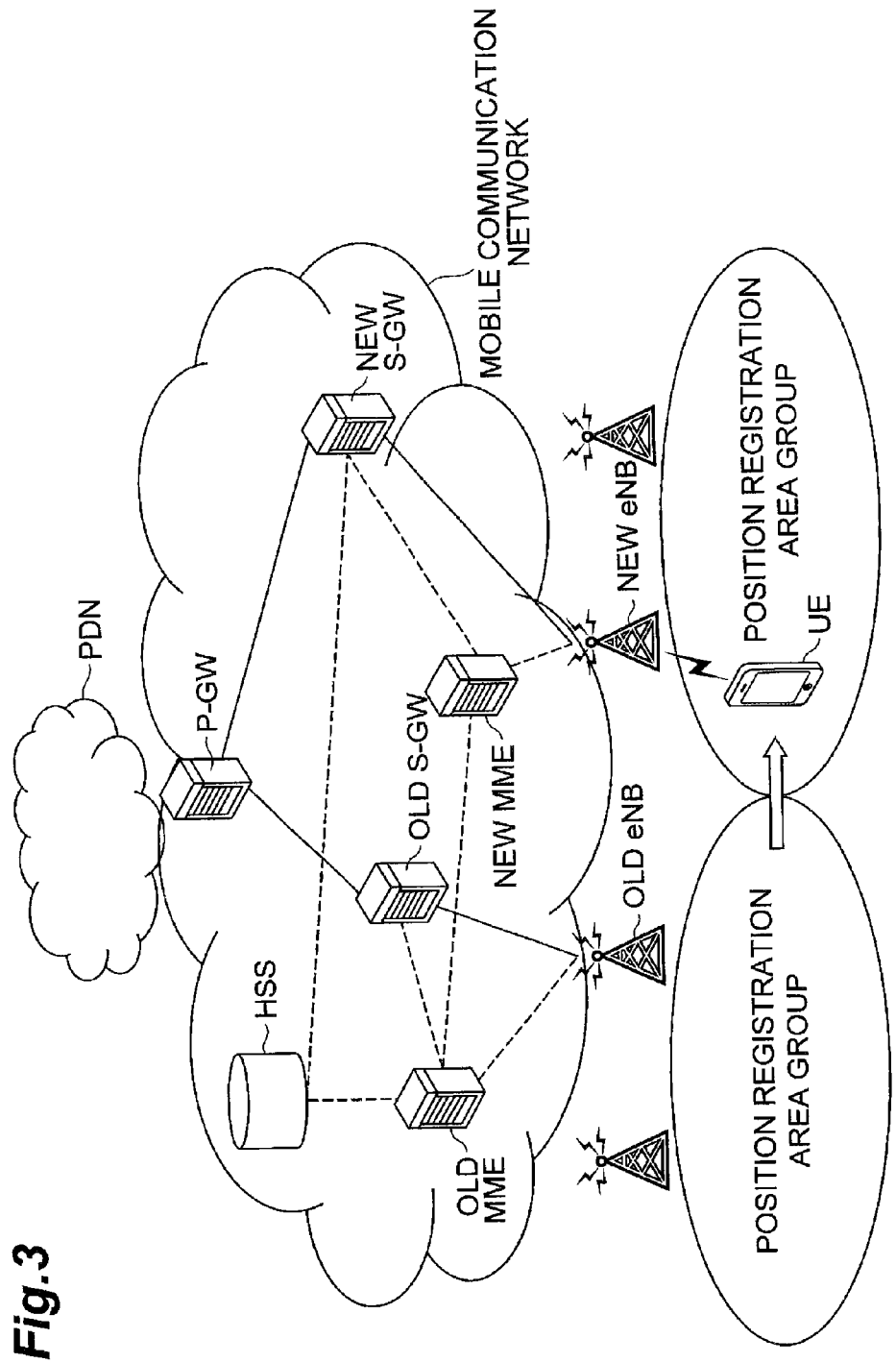
FIG. 3 is a diagram illustrating a position registration process according to the related art.

Next, the position registration process according to the related art will be described with reference to a mobile communication system shown in FIG. 3. The mobile communication system shown in FIG. 3 includes a UE, a core network, and a PDN. The core network includes an old eNB, a new eNB, an old MME, a new MME, an HSS, an old S-GW, a new S-GW, and a P-GW. Here, the old eNB, the old MME, and the old S-GW are apparatuses which are used for a communication process in a position registration area group to which the UE previously belonged. The new eNB, the new MME, and the new S-GW are apparatuses which are used for a communication process in a position registration area group to which the UE newly belongs. In the following position registration process, process numbers are given in order of processes.

1. When the UE detects that it belongs to a new position registration area group, the UE transmits a position registration signal including GUTI, which is allocated from the old MME to the new MME that manages a new area, through the new eNB.

2. The new MME specifies the old MME from the received GUTI and takes over, as information, the IMSI of the UE, the address of the attached P-GW, and IP bearer information from the old MME.

3. The new MME performs authentication, concealing, and integrity processes for the UE (this may be omitted).

4. The new MME selects a new S-GW for connection to the new eNB to which the UE newly belongs and transmits a bearer setting request including the information of the P-GW, which has taken over from the old MME, to the new S-GW.

5. A new GRE tunnel is established between the new S-GW and the P-GW.

6. The P-GW recognizes the relationship between the old GRE tunnel and the new GRE tunnel from the IMSI included in the path setting request, and hands over an information packet from the PDN to the new GRE tunnel. In addition, the P-GW establishes the new GRE tunnel and opens the old GRE tunnel.

7. The new S-GW allocates a new TEID (in advance such that the TEID tunnel can be set when the UE sends and receives a signal later) and notifies the new MME of the TEID and IP bearer information.

8. The new MME requests the HSS to perform position registration using the IMSI.

9. The HSS instructs the old MME to delete the position registration information and returns a position registration response to the new MME.

10. The new MME notifies the UE of the newly allocated GUTI and new position registration group information. The UE updates information.

11. The old MME opens the TEID related to the old S-GW.

12. In this way, the switching of the tunnel from the S-GW to the P-GW is completed.

[Attachment/Position Registration Process in S1-Flex According to the Related Art]

Figure 4:
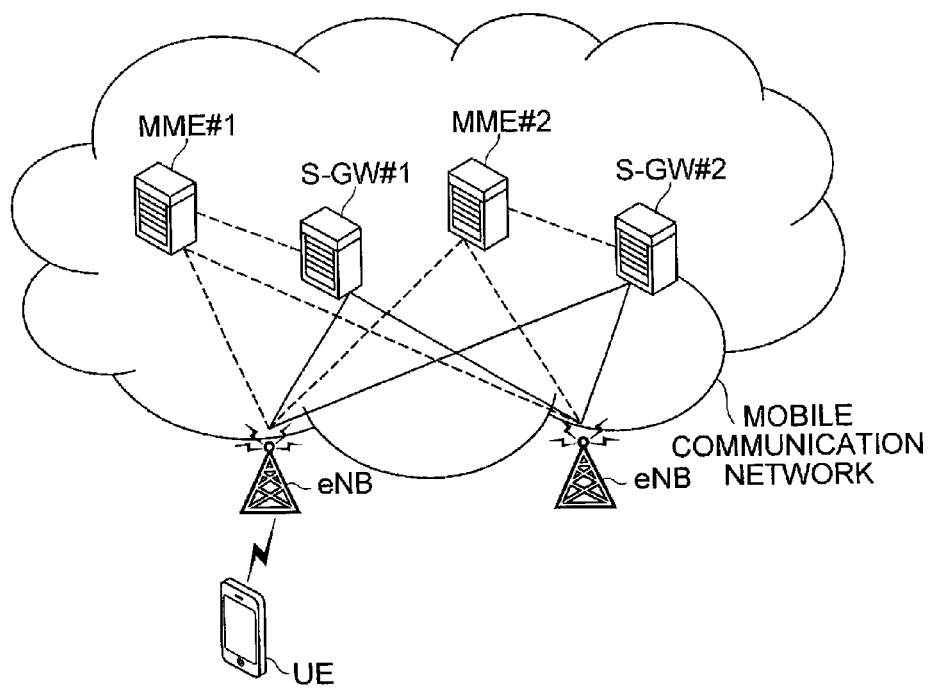
FIG. 4 is a diagram illustrating an attachment/position registration process in S1-Flex according to the related art.

Next, an attachment/position registration process in S1-Flex according to the related art will be described with reference to a mobile communication system shown in FIG. 4. The mobile communication system shown in FIG. 4 includes a UE and a core network. The core network includes two eNBs, two MMEs, and two S-GWs. As shown in FIG. 4, in S1-Flex, one eNB belongs to a plurality of MMEs and S-GWs. In the following attachment/position registration process in S1-Flex, process numbers are given in order of processes.

1. When an attachment/position registration request is received from the UE, the eNB selects any one of a plurality of MMEs (in the same pool area) to which the eNB belongs and performs the attachment/position registration process.

2. The selected MME notifies the UE of GUTI as an attachment/position registration response (the GUTI includes an identifier for identifying the MME).

3. During transmission, the UE inserts the GUTI (including an MME identifier) into a signal and transmits the signal to the eNB.

4. The eNB transmits the signal to the MME on the basis of the MME identifier. However, when a failure occurs in the MME and no response is received from the MME, the eNB performs a detachment process once and performs the attachment process for another MME in the same pool area again to receive a new call.

[Network Sharing Process According to the Related Art]

Figure 5:
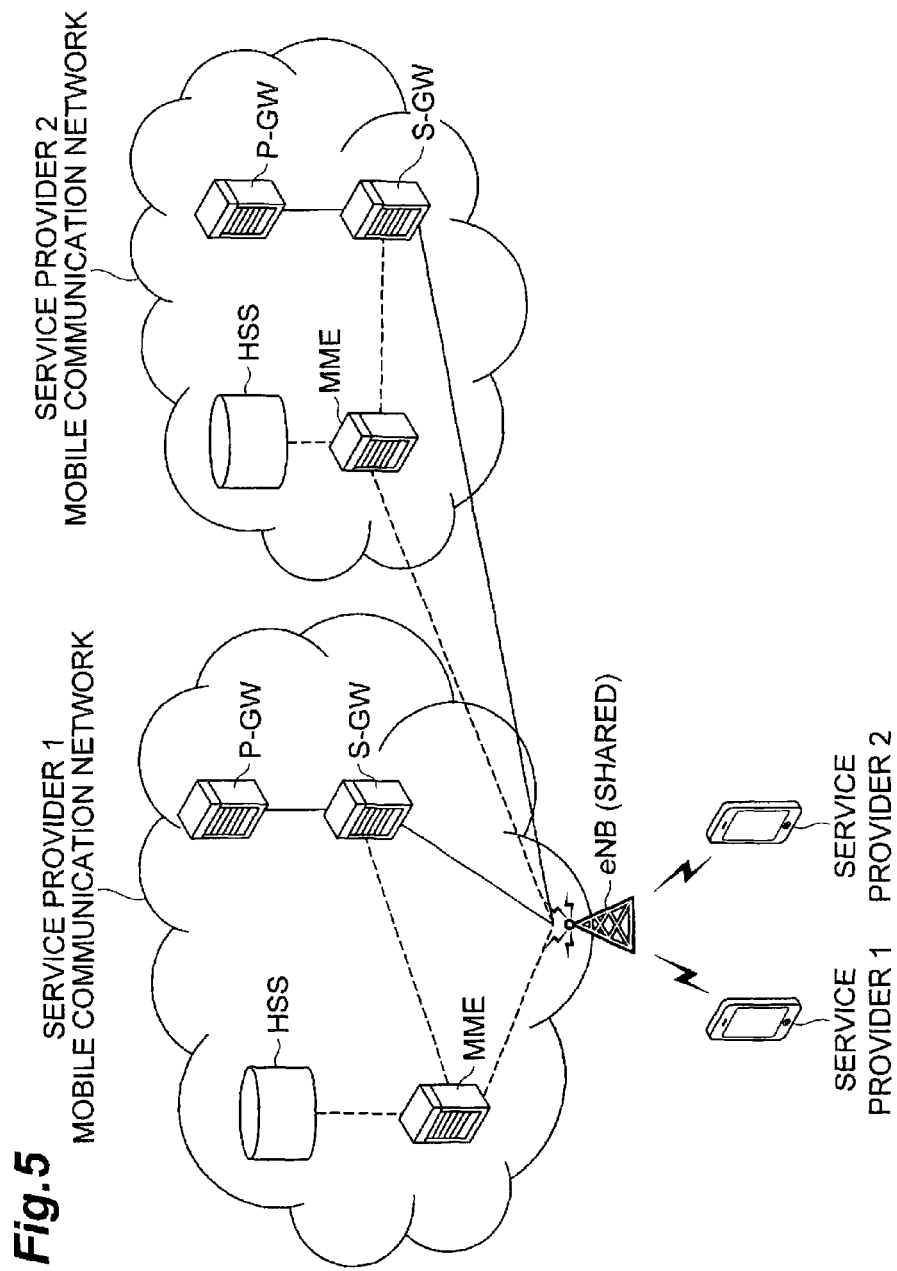
FIG. 5 is a diagram illustrating a network sharing process according to the related art.

Next, a network sharing process according to the related art will be described with reference to a mobile communication system shown in FIG. 5. The mobile communication system shown in FIG. 5 includes a UE which is joined in a mobile communication system provided by service provider 1, a UE which is joined in a mobile communication system provided by service provider 2, a service provider 1 mobile communication network which is managed by the service provider 1, and a service provider 2 mobile communication network which is managed by the service provider 2. The service provider 1 mobile communication network includes an MME, an HSS, an S-GW, and a P-GW which are managed by the service provider 1 and an eNB which is managed by both the service provider 1 and the service provider 2. The service provider 2 mobile communication network includes an MME, an HSS, an S-GW, and a P-GW which are managed by the service provider 2. In network sharing, as shown in FIG. 5, one eNB can be shared by a plurality of service provider mobile communication networks (including the MMEs, the S-GWs, and the P-GWs). In the following network sharing process, process numbers are given in order of processes.

1. The eNB is connected to a plurality of service provider network nodes and notifies information about the IDs of a plurality of service providers (a mobile country code (MCC: an identifier for identifying an operation area) and a mobile network code (MNC: an identifier for identifying a service provider)) in a radio section.

2. The UE transmits a signal including IMSI (a service provider ID to be contracted) during attachment.

3. The eNB performs network distribution using the mechanism of S1-Flex and the service provider ID included in the IMSI (GUTI).

Next, embodiments of a mobile communication network distribution system and a mobile communication network distribution method will be described with reference to the drawings. In the description of the drawings, the same components are denoted by the same reference numerals and the description thereof will not be repeated.

Figure 6:
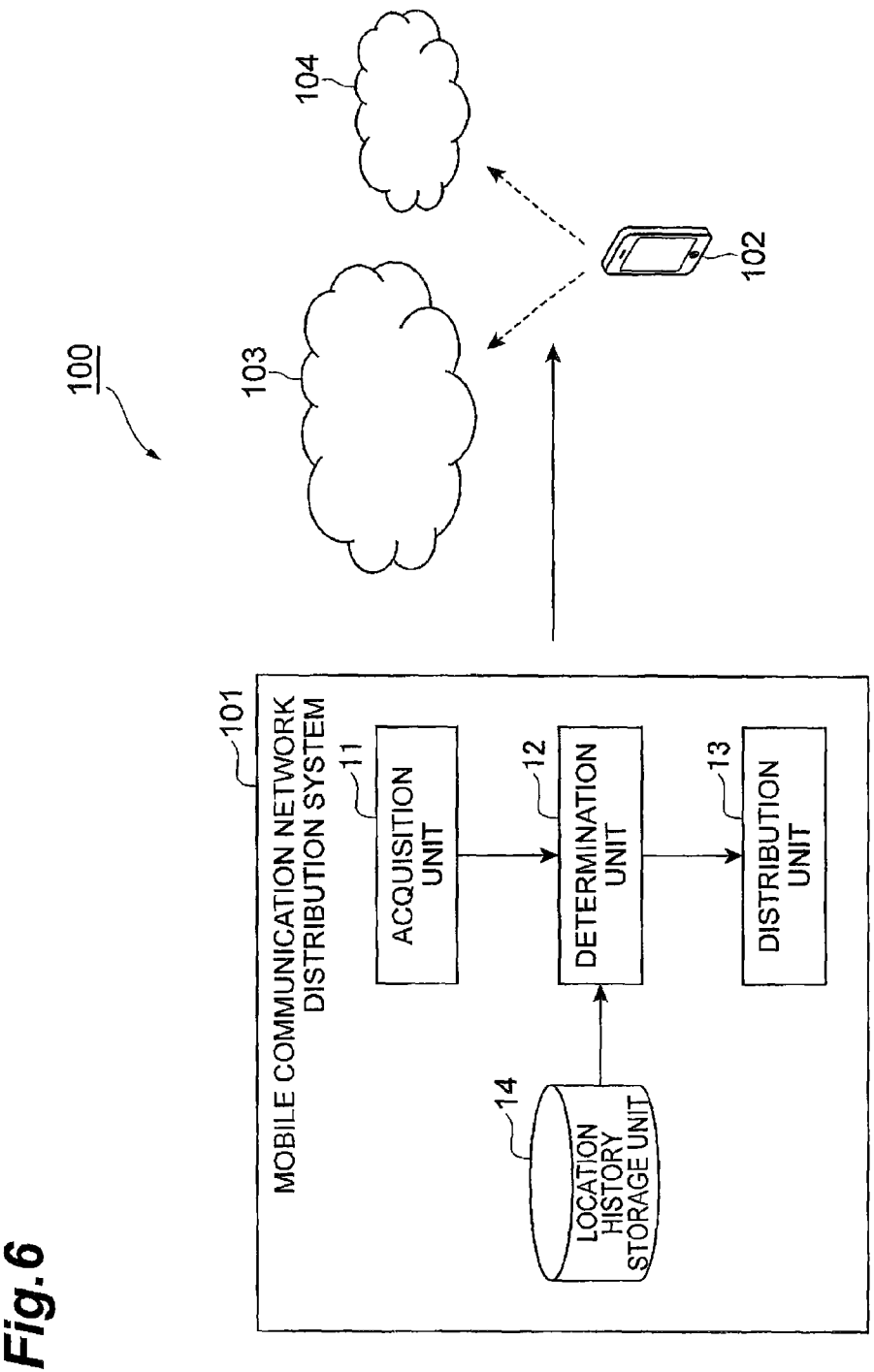
FIG. 6 is a diagram illustrating the structure of a mobile communication system according to an embodiment of the invention.

FIG. 6 is a schematic diagram illustrating a mobile communication system 100 according to this embodiment. As shown in FIG. 6, the mobile communication system 100 includes a mobile communication network distribution system 101, a UE 102, a mobile communication network 103, and a degenerate mobile communication network 104 (a mobile communication network having functions that partially differ from other mobile communication networks) which is a mobile communication network that provides limited functions. Here, the term "functions provided" are communication-related services which are provided to the UE 102 by the mobile communication network 103. In addition, the mobile communication system 100 may include two or more UEs 102, two or more mobile communication networks 103, and two or more degenerate mobile communication networks 104. The UE 102 is not limited to the UE, but may be an apparatus which can perform wireless communication.

FIG. 6 also shows a functional block diagram illustrating the structure of the mobile communication network distribution system 101 according to this embodiment. As shown in FIG. 6, the mobile communication network distribution system 101 includes an acquisition unit 11 (acquisition means), a determination unit 12 (determination means), a distribution unit 13 (distribution means), and a location history storage unit 14 (location history storage means). The mobile communication network distribution system 101 may be a general server apparatus, an HSS, an MME, or an eNB. When the mobile communication network distribution system 101 is an HSS, an MME, or an eNB, the mobile communication network distribution system 101 includes the functions of each of the HSS, the MME, or the eNB. The acquisition unit 11, the determination unit 12, the distribution unit 13, and the location history storage unit 14 which are the functions of the mobile communication network distribution system 101 may be included in one apparatus, or they may be distributed to apparatuses, such as an HSS, an MME, and an eNB included in the mobile communication system. When the functions of the mobile communication network distribution system 101 are distributed and included in a plurality of apparatuses, the functions are integrated and serve as the mobile communication network distribution system 101. Next, each function of the mobile communication network distribution system 101 will be described in detail.

The acquisition unit 11 acquires condition information including at least one of information indicating the terminal type of the UE 102, information indicating the content of the contract of the UE 102 in the mobile communication system 100, information indicating the moving state of the UE 102, information indicating the content of a service which the UE 102 requests from the mobile communication system 100, and information indicating the communication quality of the mobile communication network included in the mobile communication system 100.

Here, the information indicating the terminal type of the UE 102 is, for example, IMSI or IMEI. The information indicating the content of the contract of the UE 102 in the mobile communication system 100 is, for example, information indicating whether a communication fee for communication which is contracted with the UE 102 is based on a flat rate system or a usage-based system. The information indicating the moving state of the UE 102 is, for example, information indicating that the UE 102 remains stationary (the UE 102 belongs to a specific eNB or a specific MME) or information indicating that the UE 102 is moving (the eNB or the MME to which the UE 102 belongs is changed within a predetermined period of time). The information indicating the content of the service which the UE 102 requests from the mobile communication system 100 is, for example, information indicating a request for a mobility management function from the mobile communication system 100, information indicating a request for a position management function from the mobile communication system 100, or information indicating a request for a charging management function from the mobile communication system 100. Here, first, the position management function means a function of managing the position of the UE 102. Specifically, the position management function is, for example, a function of managing the position registration area where the UE 102 is present or the MME, a position registration function, or a paging function during reception. The mobility management function is a function of managing the movement of the UE 102 and makes it possible to track the position of the UE 102 and to call the UE 102. The mobility management function includes a position management function in a broad sense. For example, the mobility management function includes a handover process or a tunneling process for performing the handover process. The charging management function is a function of managing a charge for the services provided to the UE 102. The information indicating the communication quality of the mobile communication network included in the mobile communication system 100 is, for example, information indicating that a given mobile communication network is in a congestion state or information indicating that a failure occurs in a given mobile communication network.

The acquisition unit 11 acquires the condition information which has been acquired by its other functions, acquires the condition information stored therein, or acquires the condition information from an external apparatus, such as the UE 102, through a network. Then, the acquisition unit 11 inputs the acquired condition information to the determination unit 12.

The determination unit 12 determines the degenerate mobile communication network 104, which provides a function satisfying functional requirements based on the condition information acquired by the acquisition unit 11 (input from the acquisition unit 11) among a plurality of mobile communication networks, to be a connection destination mobile communication network which is a connection destination of the UE 102. Here, the function satisfying the functional requirements means a function that can provide all services required by the UE 102 and does not provide a service which is not required by the UE 102. The determination unit 12 inputs information about the determined connection destination mobile communication network to the distribution unit 13.

For example, it is assumed that a plurality of mobile communication networks included in the mobile communication system 100 include a degenerate mobile communication network 104A without a mobility management function and the condition information acquired by the acquisition unit 11 indicates that the UE 102 remains stationary. In this case, the determination unit 12 determines that mobility management is not required since the UE 102 remains stationary. Specifically, determination information indicating that mobility management is not required when the UE 102 remains stationary is stored in advance and the determination unit 12 determines that mobility management is not required with reference to the determination information. On the basis of the determination result, the determination unit 12 determines the degenerate mobile communication network 104A without a mobility management function to be the connection destination mobile communication network of the UE 102.

For example, it is assumed that a plurality of mobile communication networks included in the mobile communication system 100 include a degenerate mobile communication network 104B without a position management function and the condition information acquired by the acquisition unit 11 is an IMEI indicating an automatic vending machine. In this case, the determination unit 12 determines that the IMEI acquired by the acquisition unit 11 indicates the automatic vending machine, with reference to, for example, type correspondence information in which the IMEI which is stored in the mobile communication network distribution system 101 in advance is associated with information about the type of apparatus and determines that position management is not required since the position of the automatic vending machine is not changed after the automatic vending machine is installed (with reference to, for example, the determination information as described above). On the basis of the determination result, the determination unit 12 determines that the degenerate mobile communication network 104B without a position management function to be the connection destination mobile communication network of the UE 102.

For example, it is assumed that a plurality of mobile communication networks included in the mobile communication system 100 include a degenerate mobile communication network 104C without a charging management function and the condition information acquired by the acquisition unit 11 is information indicating that a communication fee for communication which is contacted with the UE 102 is based on a flat rate system. In this case, the determination unit 12 determines that the UE 102 does not require charging management since the communication fee is based on the flat rate system. On the basis of the determination result, the determination unit 12 determines the degenerate mobile communication network 104C without a charging management function to be the connection destination mobile communication network of the UE 102.

The mobile communication network distribution system 101 further includes a location history storage unit 14 that stores the history of location information about the area to which the UE 102 belongs. The determination unit 12 may determine whether the mobility management of the UE 102 is (temporarily) not required on the basis of the history of the location information stored in the location history storage unit 14.

For example, the location history storage unit 14 stores the history of location information in which the identification information of the MME to which the UE 102 indicated by the IMSI belongs is associated with the time for which the UE 102 belongs to the MME for each IMSI. In this case, the determination unit 12 calculates, for example, an MME to which the UE 102 belongs and the relationship between the time for which the UE 102 belongs to the MME and the probability (%) of movement of the UE 102 (the frequency of movement) on the basis of the history. When the probability is less than a predetermined threshold value which is stored in advance, the determination unit 12 determines that the mobility management of the UE 102 is (temporarily) not required. When the probability is greater than the predetermined threshold value, the determination unit 12 determines that the mobility management of the UE 102 is (temporarily) required.

For example, the location history storage unit 14 stores the history of location information in which the eNB to which the UE 102 indicated by the IMSI belongs is associated with the time for which the UE 102 belongs to the eNB for each IMSI. In this case, the determination unit 12 calculates, for example, the probability of the UE 102 belonging to a given eNB for a given period of time or movement frequency probability, compares the probability with a predetermined threshold value which is stored in advance, similarly to the above, and determines whether the mobility management of the UE 102 is (temporarily) required on the basis of the comparison result.

The distribution unit 13 distributes the connection destination of the UE 102 to the connection destination mobile communication network determined by the determination unit 12 (the connection destination mobile communication network indicated by information about the connection destination mobile communication network input from the determination unit 12).

Next, embodiments in which the mobile communication system 100 is applied to the mobile communication system will be described.

First Embodiment

Figure 7:
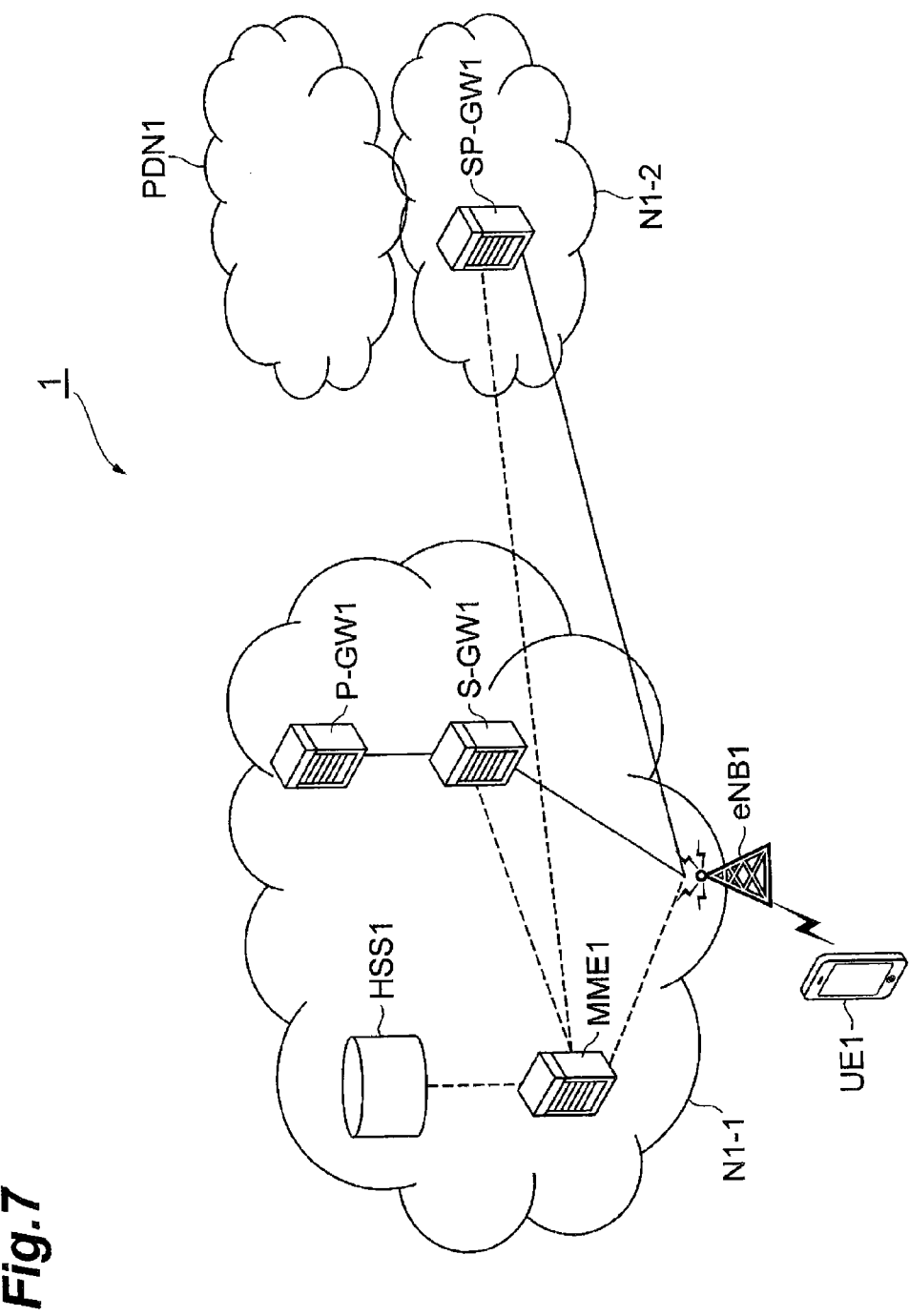
FIG. 7 is a diagram illustrating the structure of a mobile communication system according to a first embodiment of the invention.

First, a mobile communication network distribution system and a mobile communication network distribution method according to a first embodiment will be described with reference to FIGS. 7 and 8. FIG. 7 is a diagram illustrating the outline of a mobile communication system 1 according to the first embodiment. The mobile communication system 1 provides a mobile communication function to UE1 which is a mobile communication terminal. As shown in FIG. 7, the mobile communication system 1 includes UE1, N1-1 and N1-2 which are mobile communication networks, and PDN1. Here, N1-1 is a mobile communication network according to the related art which is defined by 3GPP and N1-2 is a degenerate mobile communication network which is a mobile communication network without the mobility management function of the mobile communication network according to the related art. In addition, N1-2 may be constructed by a server virtualization technique. For example, SP-GW1 forming N1-2 is divided into a plurality of virtual computers. N1-1 includes eNB1, MME1, HSS1, S-GW1, and P-GW1. In addition, N1-2 includes SP-GW1 which is an apparatus or a node having only some of the functions (without a mobility management function) of an S-GW and a P-GW.

In the first embodiment, the mobile communication network distribution system corresponds to HSS1. That is, HSS1 includes an acquisition unit 11, a determination unit 12, and a distribution unit 13.

Next, an attachment process according to this embodiment will be described with reference to the mobile communication system 1 shown in FIG. 7. In the following attachment process, process numbers are given in order of processes.

1. When UE1 is turned on, UE1 transmits an attachment signal including an IMSI (and an IMEI) to eNB1. Here, it is assumed that UE1 does not designate the address of a PDN which is a connection destination.

2. eNB1 transmits a signal to MME1 that is an MME to which eNB1 belongs (in the case of S1-Flex, one MME among one or more MMEs to which eNB1 belongs).

3. When receiving the attachment process, MME1 receives authentication information from HSS 1 and performs authentication, concealing, and integrity processes for UE1.

4. MME1 transmits a position registration signal to HSS1 and HSS1 registers MME1 which controls UE1.

5. Here, since UE1 does not designate the address of the PDN, the determination unit 12 of HSS1 determines N1-2 to be the connection destination mobile communication network on the basis of IMSI or IMEI acquired by the acquisition unit 11 of HSS1 (for example, as described above, the determination unit 12 determines that the mobility management of UE1 is not required on the basis of the acquired IMEI and type correspondence information which is stored in advance and determines N1-2 without a mobility management function) and the distribution unit 13 of HSS1 returns the domain information of PDN1 to MME1 in order to distribute N1-2 to the connection destination of UE1.

6. MME1 transmits the domain information of PDN1, which is a connection destination, to a DNS (not shown) and receives the address of SP-GW1 corresponding to the address of PDN1 as a response.

7. MME1 transmits a bearer setting request directed to SP-GW1, using the received address of SP-GW1.

8. SP-GW1 outputs the IP address directed to UE1 (a GRE tunnel process is omitted).

9. MME1 notifies UE1 of the IP address output from P-GW1 and GUTI, which is a temporary identifier of UE1 allocated by MME1, and establishes a wireless data bearer. In addition, MME1 notifies eNB1 of the address of SP-GW1. Then, a TEID tunnel is established between eNB1 and SP-GW1.

10. In this way, a communication path from UE1 to SP-GW1 is established.

11. Thereafter, UE1 uses GUTI as an identifier, instead of IMSI.

Figure 8:
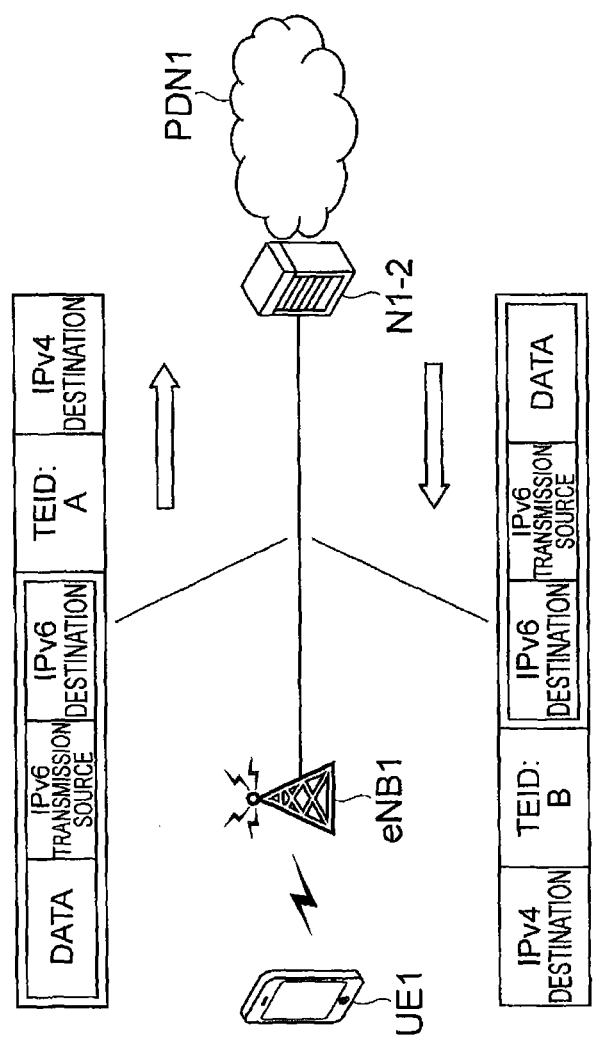
FIG. 8 is a diagram illustrating the content of a packet which flows through a TEID tunnel in the first embodiment of the invention.

FIG. 8 is a diagram illustrating the content of an IP packet which flows through the TEID tunnel established between eNB1 and N1-2. As can be seen from comparison with FIG. 2, in the mobile communication system 1 according to this embodiment, the TEID tunnel is terminated by N1-2 (a GRE tunnel is not established) and a user IP packet is exchanged with PDN1.

Next, the difference between the technique according to the related art and the mobile communication system 1 according to the first embodiment will be described. The setting of the PDN according to the related art is used to specify a packet data network which is a connection destination and to specify a P-GW of a mobile communication network according to the related art which is a connection point with the packet data network. In the mobile communication system 1 according to the first embodiment, SP-GW1, which is a node of N1-2 formed by an individual function set (that is different from N1-1 with functions for providing various services according to the related art), is selected, on the basis of the characteristics of the services provided by PDN1, in order for connection to PDN1 and eNB1 is connected to PDN1. When N1-2 is formed by a virtualization server, it is possible to appropriately increase or decrease the amount of resources of an individual network, on the basis of the amount of services required which varies depending on the number of service subscribers or a service time.

Here, the mobile communication system 1 according to the first embodiment 1 uses SP-GW1. Therefore, there is a restriction that a GRE tunnel is not supported and the switching (handover) of the GRE tunnel is not supported, but it is possible to reduce the number of processes related to the GRE tunnel in S-GW1 and P-GW1.

Modification of First Embodiment

A modification of the first embodiment will be described. UE1 stores a correspondence table between the address of a PDN and the address of another PDN in advance. For example, UE1 stores a correspondence table between the address of a PDN corresponding to N1-1 and the address of a PDN corresponding to N1-2 in advance. When communication with the PDN corresponding to N1-1 is not performed for a predetermined period of time or more, UE1 performs reattachment to a PDN indicated by the address of the PDN corresponding to N1-2 which is stored in the correspondence table and forms a pair with the address of the PDN corresponding to N1-1. In this way, it is possible to achieve connection through N1-2 by each PDN after reattachment.

Second Embodiment

Figure 9:
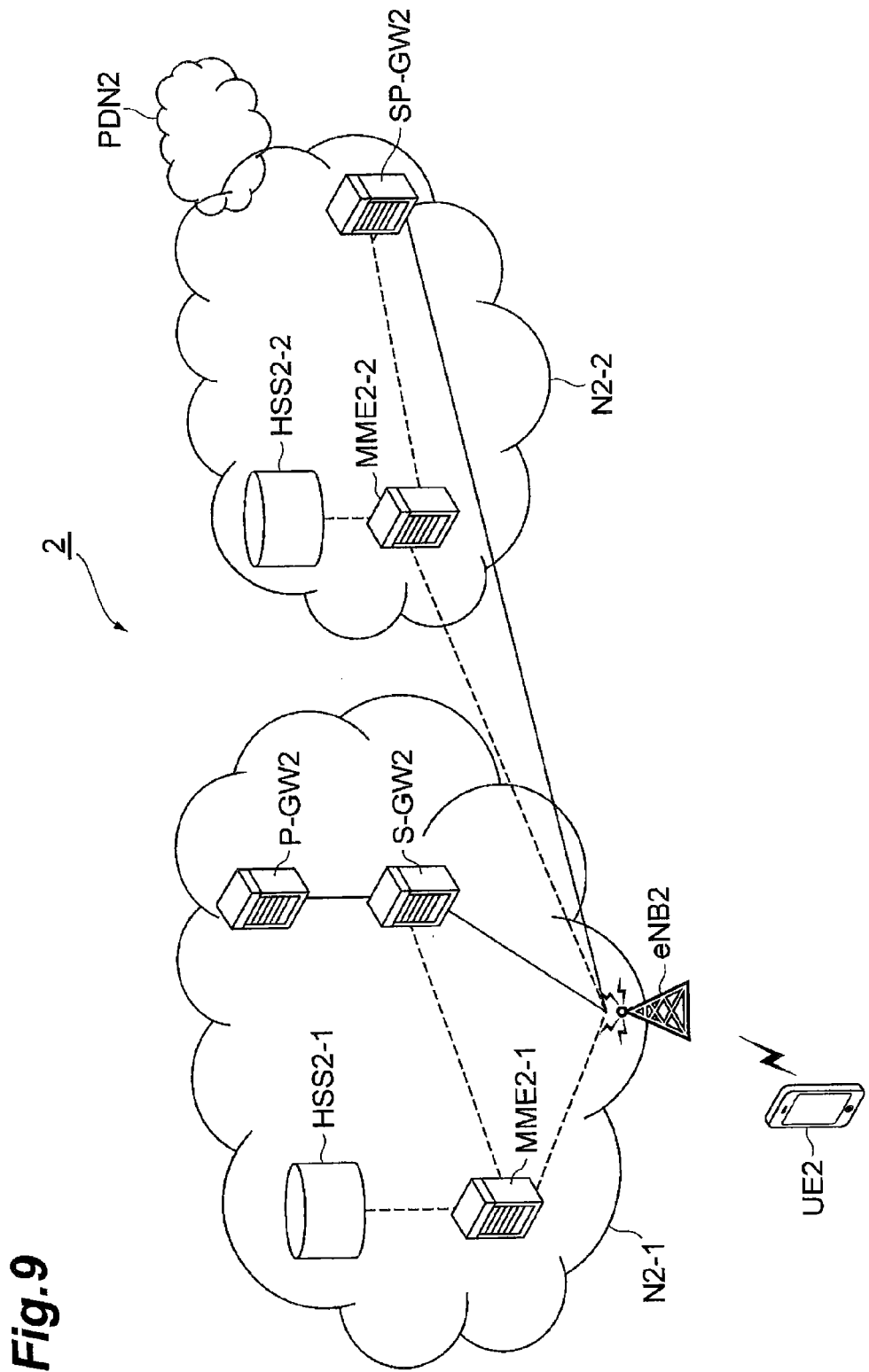
FIG. 9 is a diagram illustrating the structure of a mobile communication system according to a second embodiment of the invention.

Next, a mobile communication network distribution system and a mobile communication network distribution method according to a second embodiment will be described with reference to FIG. 9. FIG. 9 is a diagram illustrating the outline of a mobile communication system 2 according to the second embodiment. The mobile communication system 2 provides a mobile communication function to UE2 which is a mobile communication terminal. As shown in FIG. 9, the mobile communication system 2 includes UE2, N2-1 and N2-2 which are mobile communication networks, and PDN2. Here, N2-1 is a mobile communication network according to the related art which is defined by 3GPP and N2-2 is a degenerate mobile communication network which is a mobile communication network without a mobility management function of the mobile communication network according to the related art. In addition, N2-2 may be constructed by a server virtualization technique. N2-1 includes eNB2, MME2-1, HSS2-1, S-GW2, and P-GW2. N2-2 includes MME2-2 having only some of the functions of an MME, HSS2-2 having only some of the functions of an HSS, and SP-GW2 which is an apparatus or a node having only some of the functions (without a mobility management function) of an S-GW and a P-GW.

In the second embodiment, the mobile communication network distribution system corresponds to eNB2. That is, eNB2 includes an acquisition unit 11, a determination unit 12, and a distribution unit 13.

Next, an attachment/position registration process in S1-Flex according to this embodiment will be described with reference to the mobile communication system 2 shown in FIG. 9. In the following attachment/position registration process in S1-Flex, process numbers are given in order of processes.

1. When there is an attachment request from UE2, the acquisition unit 11 of eNB2 acquires IMSI or IMEI included in the signal. Then, the determination unit 12 of eNB2 selects N2-2 (MME2-2) from a plurality of mobile communication networks to which eNB2 belongs, using the same determination process as that in the first embodiment. Then, the distribution unit 13 of eNB2 performs the attachment/position registration process for MME2-2 in order to distribute N2-2 to the connection destination of UE2.

2. The selected MME2-2 notifies UE2 of GUTI as an attachment response (GUTI includes an identifier for identifying MME2-2).

3. During transmission, UE2 inserts GUTI (the included MME identifier) into a signal and transmits the signal to eNB2.

4. eNB2 recognizes the MME identifier and transmits the MME identifier to MME2-2.

5. (The subsequent processes are the same as those after process number 3 in the attachment process described in the first embodiment)

Next, the difference between the technique according to the related art and the mobile communication system 2 according to the second embodiment will be described. S1-Flex according to the related art is used to distribute the load of an MME apparatus or to achieve redundancy when a failure occurs in the MME. In contrast, in the mobile communication system 2 according to the second embodiment, eNB2 determines the characteristics of the services received by UE2 from IMSI or IMEI (for example, eNB2 stores service information, in which IMSI or IMEI is associated with the service characteristics of the UE indicated by IMSI or IMEI, in advance, and determines the service characteristics with reference to the service information whenever IMSI or IMEI is received) and selects N2-2 including an individual function set (which is different from N2-1 with functions for providing various services according to the related art).

Here, the mobile communication system 2 according to the second embodiment uses SP-GW2. Therefore, there is a restriction that a GRE tunnel is not supported and the switching (handover) of the GRE tunnel is not supported, but it is possible to reduce the number of processes related to the GRE tunnel in an S-GW and a P-GW. In addition, the mobile communication system 2 uses MME2-2. Therefore, there is a restriction that reattachment is required when UE2 is moved across position registration areas, but it is possible to reduce the number of processes which hands over information (for example, IMSI, a P-GW address, or IP bearer information) from an old MME to a new MME. When HSS2-2 is used, there is a restriction that the management of information specialized in the services is limited, but it is possible to reduce the content of subscriber information items specialized in the services.

In addition, since degenerate nodes, such as SP-GW2, MME2-2, and HSS2-2, are used, it is possible to simplify mobility management (a position registration cycle and a paging process), to reduce the number of subscriber information items, and to reduce the number of service competition processes.

Modification of Second Embodiment

A modification of the second embodiment will be described. When a connection destination is N2-1 and the number of services that is equal to or greater than a predetermined value is not received, UE2 may switch the IMSI to another IMSI (a specific MME code or a specific service provider code) for connection to N2-2 in response to a connection request and perform reattachment.

Third Embodiment

Figure 10:
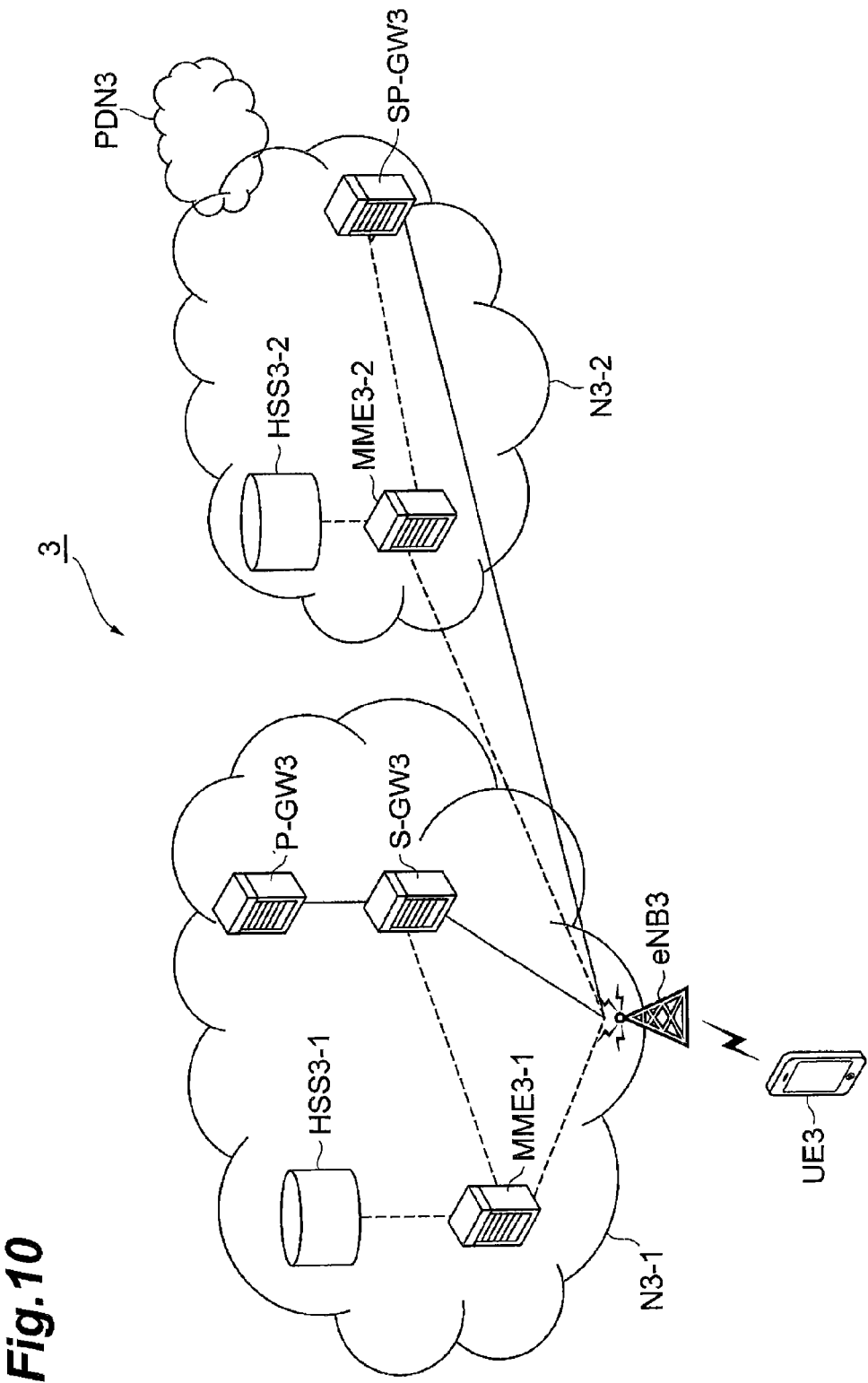
FIG. 10 is a diagram illustrating the structure of a mobile communication system according to a third embodiment of the invention.

Next, a mobile communication network distribution system and a mobile communication network distribution method according to a third embodiment will be described with reference to FIG. 10. FIG. 10 is a diagram illustrating the outline of a mobile communication system 3 according to the third embodiment. The mobile communication system 3 provides a mobile communication function to UE3 which is a mobile communication terminal. As shown in FIG. 10, the mobile communication system 3 includes UE3, N3-1 and N3-2 which are mobile communication networks, and PDN3. Here, N3-1 is a mobile communication network according to the related art which is defined by 3GPP and N3-2 is a degenerate mobile communication network which is a mobile communication network without a mobility management function of the mobile communication network according to the related art. In addition, N3-2 may be constructed by the server virtualization technique. N3-1 includes eNB3, MME3-1, HSS3-1, S-GW3, and P-GW3. N3-2 includes MME3-2 having only some of the functions of an MME, HSS3-2 having only some of the functions of an HSS, and SP-GW3 which is an apparatus or a node having only some of the functions of an S-GW and a P-GW.

In general, in network sharing, one eNB can be shared by a plurality of service provider networks (an MME, an S-GW, and a P-GW). In the third embodiment, a separate service provider ID is prepared for N3-2 which is a network for providing specific services and N3-2 is added as a network of one of a plurality of service providers to one shared eNB.

In the third embodiment, the mobile communication network distribution system corresponds to eNB3. That is, eNB3 includes an acquisition unit 11, a determination unit 12, and a distribution unit 13.

Next, a network sharing process according to this embodiment will be described with reference to the mobile communication system 3 shown in FIG. 10. In the following network sharing process, process numbers are given in order of processes.

1. eNB3 is connected to a plurality of service provider network nodes and notifies information about the IDs (MCC and MNC) of a plurality of service providers in a radio section.

2. During attachment, UE3 inserts IMSI (in this case, a service provider ID corresponding to N3-2 which is a specific service) into a signal and transmits the signal.

3. eNB3 distributes a network, using the structure of S1-Flex and the service provider ID included in the IMSI (GUTI). Specifically, the acquisition unit 11 of eNB3 acquires the IMSI (GUTI) including the service provider ID from UE3. The determination unit 12 of eNB3 determines N3-2 to be the connection destination mobile communication network on the basis of the IMSI, using the same determination process as that in the first embodiment. The distribution unit 13 of eNB3 distributes the connection destination of UE3 to N3-2.

4. (The subsequent processes are the same as those after process number 3 in the attachment process described in the first embodiment)

Next, the difference between the technique according to the related art and the mobile communication system 3 according to the third embodiment will be described. In network sharing according to the related art, different service providers perform distribution to their mobile communication networks according to the related art while sharing one eNB. In contrast, in the mobile communication system 3 according to the third embodiment, one service provider has networks for different service characteristics and distributes the networks.

Modification of Third Embodiment

Next, a modification of the third embodiment will be described. When a process with host MMEs whose number is equal to or greater than a predetermined value is not completed, or in response to instructions from a network management control apparatus which will be described in a seventh embodiment, eNB writes UE7 identification information to a header of a signal transmitted from UE7 with specific IMSI/IMEI/GUTI to distribute the connection destination of UE7 to N3-2.

Fourth Embodiment

Figure 11:
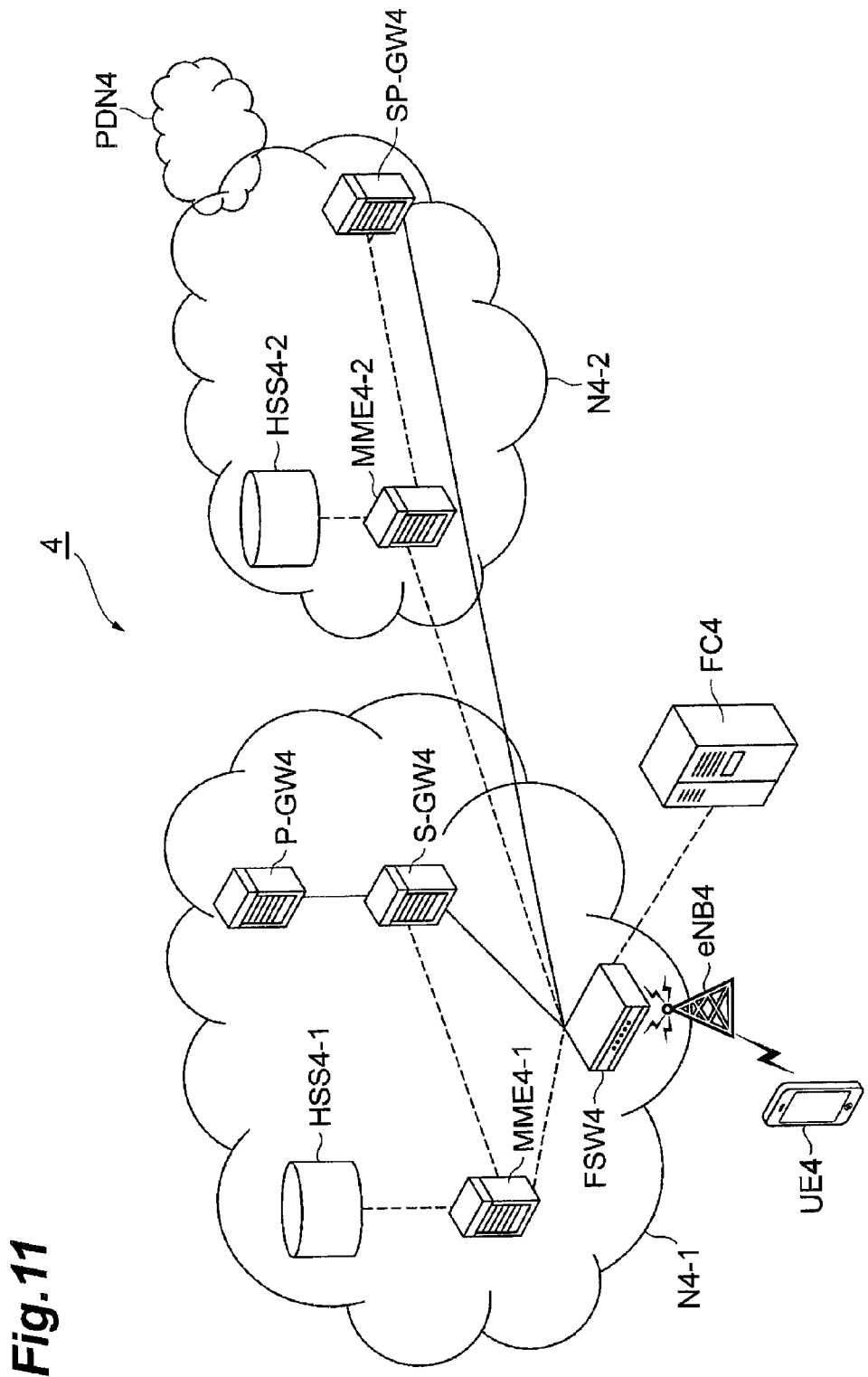
FIG. 11 is a diagram illustrating the structure of a mobile communication system according to a fourth embodiment of the invention.

Next, a mobile communication network distribution system and a mobile communication network distribution method according to a fourth embodiment will be described with reference to FIG. 11. FIG. 11 is a diagram illustrating the outline of a mobile communication system 4 according to the fourth embodiment. The mobile communication system 4 provides a mobile communication function to UE4 which is a mobile communication terminal. As shown in FIG. 11, the mobile communication system 4 includes UE4, FC4 which is a flow controller (which will be described below), N4-1 and N4-2 which are mobile communication networks, and PDN4. Here, N4-1 is a mobile communication network according to the related art which is defined by 3GPP and N4-2 is a degenerate mobile communication network which is a mobile communication network without a mobility management function of the mobile communication network according to the related art. In addition, N4-2 may be constructed by the server virtualization technique. N4-1 includes eNB4, FSW4 which is a flow switch (which will be described below), MME4-1, HSS4-1, S-GW4, and P-GW4. N4-2 includes MME4-2 having only some of the functions of an MME, HSS4-2 having only some of the functions of an HSS, and SP-GW4 which is an apparatus or a node having only some of the functions of an S-GW and a P-GW.

FC4 and FSW4 are components of an OpenFlow network. The OpenFlow network is a flow control network that is connected to each of a UE, an MME, an S-GW/SP-GW, and an eNB and forms a communication path between the apparatuses. The OpenFlow network and UE4 are connected to each other through eNB4, and eNB4 and network nodes (for example, MME4 and S-GW4) are connected to each other through FSW4. The OpenFlow network includes OpenFlow switches which are connected to each other. The OpenFlow network transmits and receives information under the control of FC4 which is an OpenFlow controller. Specifically, FSW4 receives a flow entry indicating the node to which received information will be transmitted from FC4 and transmits and receives information corresponding to the flow entry. In the invention, the OpenFlow network has been described. However, a so-called software defined network (SDN) which performs the same flow control as described above and performs a flow transmission process according to the control may be used.

In the fourth embodiment, the mobile communication network distribution system corresponds to FSW4. That is, FSW4 includes an acquisition unit 11, a determination unit 12, and a distribution unit 13.

Next, a flow control process according to this embodiment will be described with reference to the mobile communication system 4 shown in FIG. 11. In the following flow control process, process numbers are given in order of processes.

1. When UE4 is turned on, UE4 transmits an attachment signal including IMSI and IMEI to eNB4.
2. eNB4 reads IMSI/IMEI and GUTI in the signal, writes corresponding specific UE identification information to the header of a packet, and transmits a signal to an arbitrary MME to which eNB4 belongs.
3. FSW4 distinguishes the UE identification information in the packet header and transmits the signal to MME4-2. Specifically, the acquisition unit 11 of FSW4 acquires the UE identification information in the packet header from eNB4. The determination unit 12 of FSW4 determines MME4-2 to be the connection destination mobile communication network on the basis of the UE identification information, using the same determination process as that in the first embodiment. The distribution unit 13 of FSW4 distributes MME4-2 as the connection destination of UE4.
4. (The subsequent processes are the same as those after process number 3 in the attachment process described in the first embodiment)

Fifth Embodiment

Figure 12:
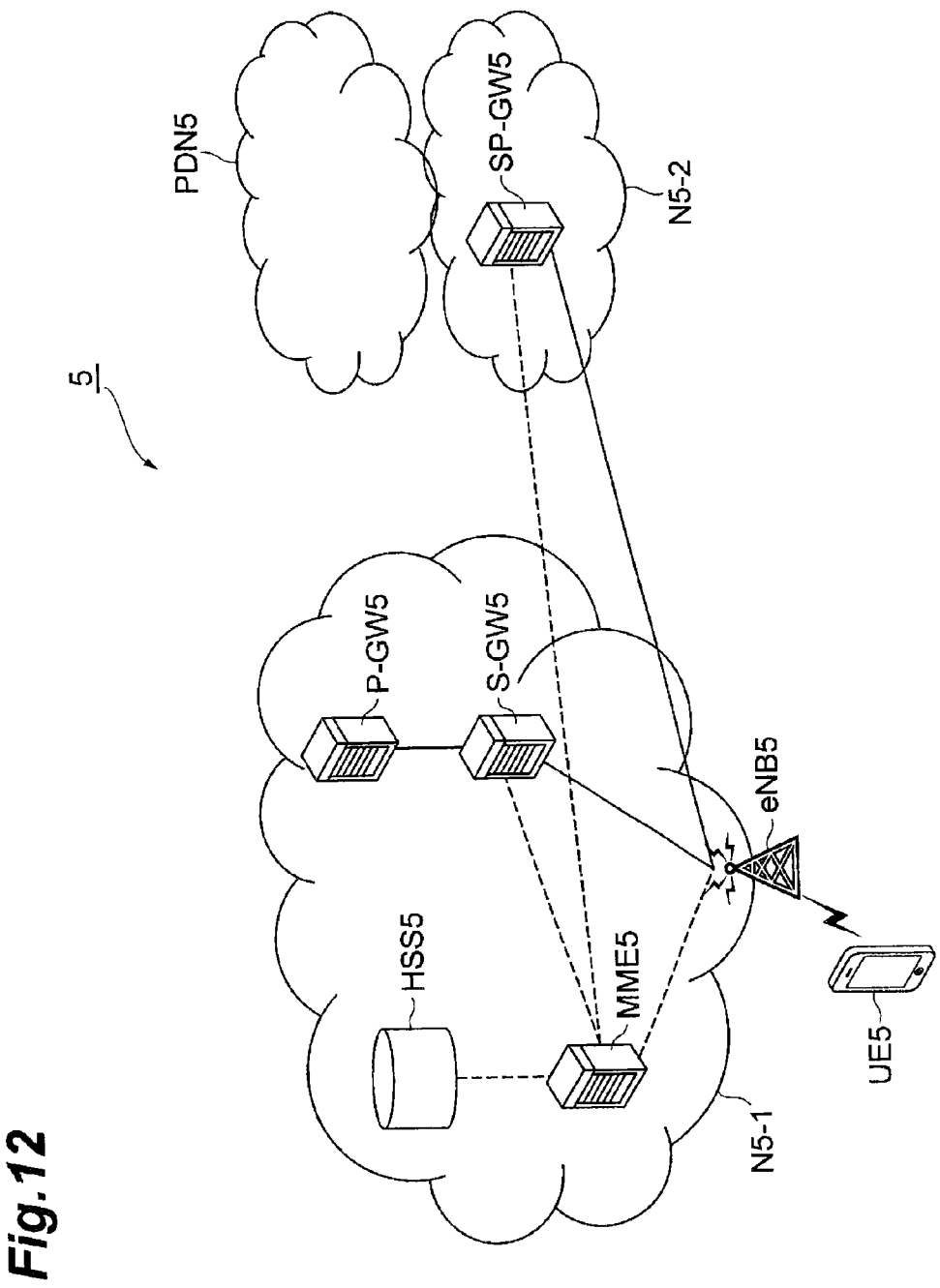
FIG. 12 is a diagram illustrating the structure of a mobile communication system according to a fifth embodiment of the invention.

Next, a mobile communication network distribution system and a mobile communication network distribution method according to a fifth embodiment will be described with reference to FIG. 12. FIG. 12 is a diagram illustrating the outline of a mobile communication system 5 according to the fifth embodiment. The mobile communication system 5 provides a mobile communication function to UE5 which is a mobile communication terminal. As shown in FIG. 12, the mobile communication system 5 includes UE5, N5-1 and N5-2 which are mobile communication networks, and PDN5. Here, N5-1 is a mobile communication network according to the related art which is defined by 3GPP and N5-2 is a degenerate mobile communication network which is a mobile communication network without a mobility management function of the mobile communication network according to the related art. In addition, N5-2 may be constructed by the server virtualization technique. N5-1 includes eNB5, MME5, HSS5, S-GW5, and P-GW5. N5-2 includes SP-GW5 which is an apparatus or a node having only some of the functions of an S-GW and a P-GW.

In the fifth embodiment, the mobile communication network distribution system corresponds to HSS5. That is, HSS5 includes an acquisition unit 11, a determination unit 12, a distribution unit 13, and a location history storage unit 14. Here, the location history storage unit 14 stores the history of location information in which the identification information of the MME to which UE5 indicated by IMSI belongs is associated with the time for which UE5 belongs to the MME for each IMSI. The determination unit 12 calculates, for example, an MME to which UE5 belongs and the relationship between the time for which UE5 belongs to the MME and the probability (%) of UE5 moving, on the basis of the history. Then, the determination unit 12 compares the probability with a predetermined threshold value and determines whether the mobility management of UE5 is not required on the basis of the comparison result.

Next, an attachment process which is performed in operative association with an HSS in this embodiment will be described with reference to the mobile communication system 5 shown in FIG. 12. In the following attachment process performed in operative association with the HSS, process numbers are given in order of processes.

1. When position registration is performed with the movement of UE5 or when position registration is performed due to attachment, the determination unit 12 of HSS5 determines to make UE5 belong to N5-2, with reference to the history of the location information stored in the location history storage unit 14, when the probability of movement of UE5 belonging to MME5 for the time is equal to or less than a predetermined threshold value.
2. The subsequent process is 2-1 or 2-2.
2-1. When the position registration is performed, the distribution unit 13 of HSS5 prompts UE5 to perform a detachment process and instructs UE5 to perform attachment using the address of new specific PDN5, thereby distributing the connection destination of UE5 to N5-2 (the processes after process number 2-1 are the same as those in the modification of the first embodiment).
2-2. When the position registration is performed, HSS5 prompts UE5 to perform the detachment process and instructs UE5 to perform attachment using new specific IMSI, thereby distributing the connection destination of UE5 to N5-2 (the processes after process number 2-2 are the same as those in the second embodiment or the third embodiment).

Sixth Embodiment

Figure 13:
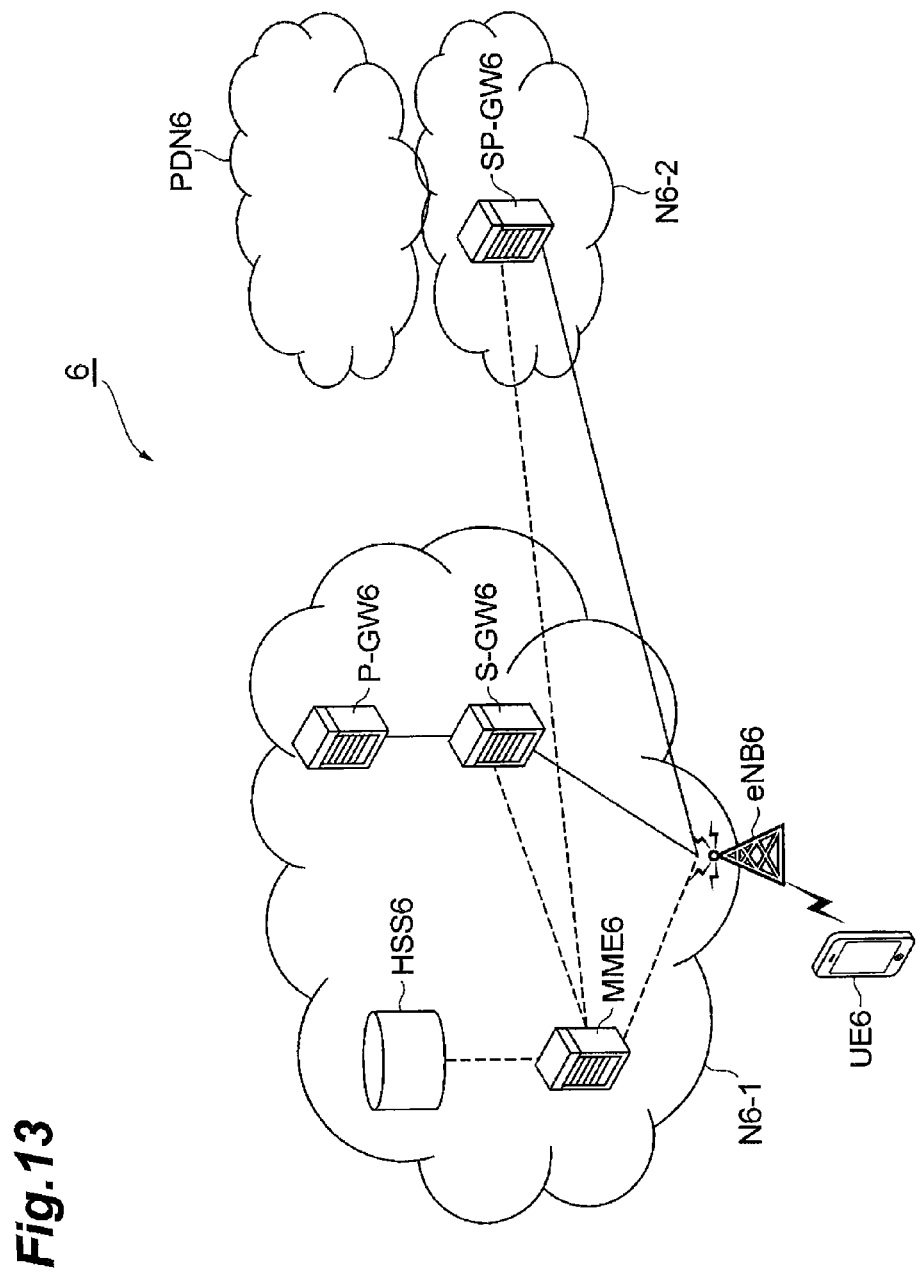
FIG. 13 is a diagram illustrating the structure of a mobile communication system according to a sixth embodiment of the invention.

Next, a mobile communication network distribution system and a mobile communication network distribution method according to a sixth embodiment will be described with reference to FIG. 13. FIG. 13 is a diagram illustrating the outline of a mobile communication system 6 according to the sixth embodiment. The mobile communication system 6 provides a mobile communication function to UE6 which is a mobile communication terminal. As shown in FIG. 13, the mobile communication system 6 includes UE6, N6-1 and N6-2 which are mobile communication networks, and PDN6. Here, N6-1 is a mobile communication network according to the related art which is defined by 3GPP and N6-2 is a degenerate mobile communication network which is a mobile communication network without a mobility management function of the mobile communication network according to the related art. In addition, N6-2 may be constructed by the server virtualization technique. N6-1 includes eNB6, MME6, HSS6, S-GW6, and P-GW6. N6-2 includes SP-GW6 which is an apparatus or a node having only some of the functions of an S-GW and a P-GW.

In the sixth embodiment, the mobile communication network distribution system corresponds to MME6. That is, MME6 includes an acquisition unit 11, a determination unit 12, a distribution unit 13, and a location history storage unit 14. Here, the location history storage unit 14 stores the history of location information in which an eNB to which UE6 indicated by IMSI belongs is associated with the time for which UE6 belongs to the eNB for each IMSI. The determination unit 12 calculates, for example, a base station to which UE6 belongs, the time for which UE6 belongs the base station, the probability of UE6 belonging to the base station, and a movement frequency probability on the basis of the history. Then, the determination unit 12 compares the calculated value with a predetermined threshold value and determines whether the mobility management of UE6 is not required on the basis of the comparison result.

Next, a position registration process which is performed in operative association with an MME in this embodiment will be described with reference to the mobile communication system 6 shown in FIG. 13. In the following position registration process performed in operative association with the MME, process numbers are given in order of processes.

1. When UE6 performs attachment/transmission/position registration through new eNB6, the determination unit 12 of MME6 determines to make UE6 belong to N6-2, with reference to the history of the location information related to the IMSI which is stored in the location history storage unit 14, when the probability of movement of UE6 for the time is equal to or less than a predetermined threshold value.

2. The subsequent process is 2-1 or 2-2.

2-1. When the attachment/transmission/position registration are performed, the distribution unit 13 of MME6 prompts UE6 to perform a detachment process and instructs UE6 to perform attachment using the address of new PDN6, thereby distributing the connection destination of UE6 to N6-2 (the processes after process number 2-1 are the same as those in the modification of the first embodiment).

2-2. When the attachment/transmission/position registration are performed, the distribution unit 13 of MME6 prompts UE6 to perform the detachment process and instructs UE6 to perform attachment using a new specific IMSI, thereby distributing the connection destination of UE6 to N6-2 (the processes after process number 2-1 are the same as those in the second embodiment or the third embodiment).

Seventh Embodiment

Figure 14:
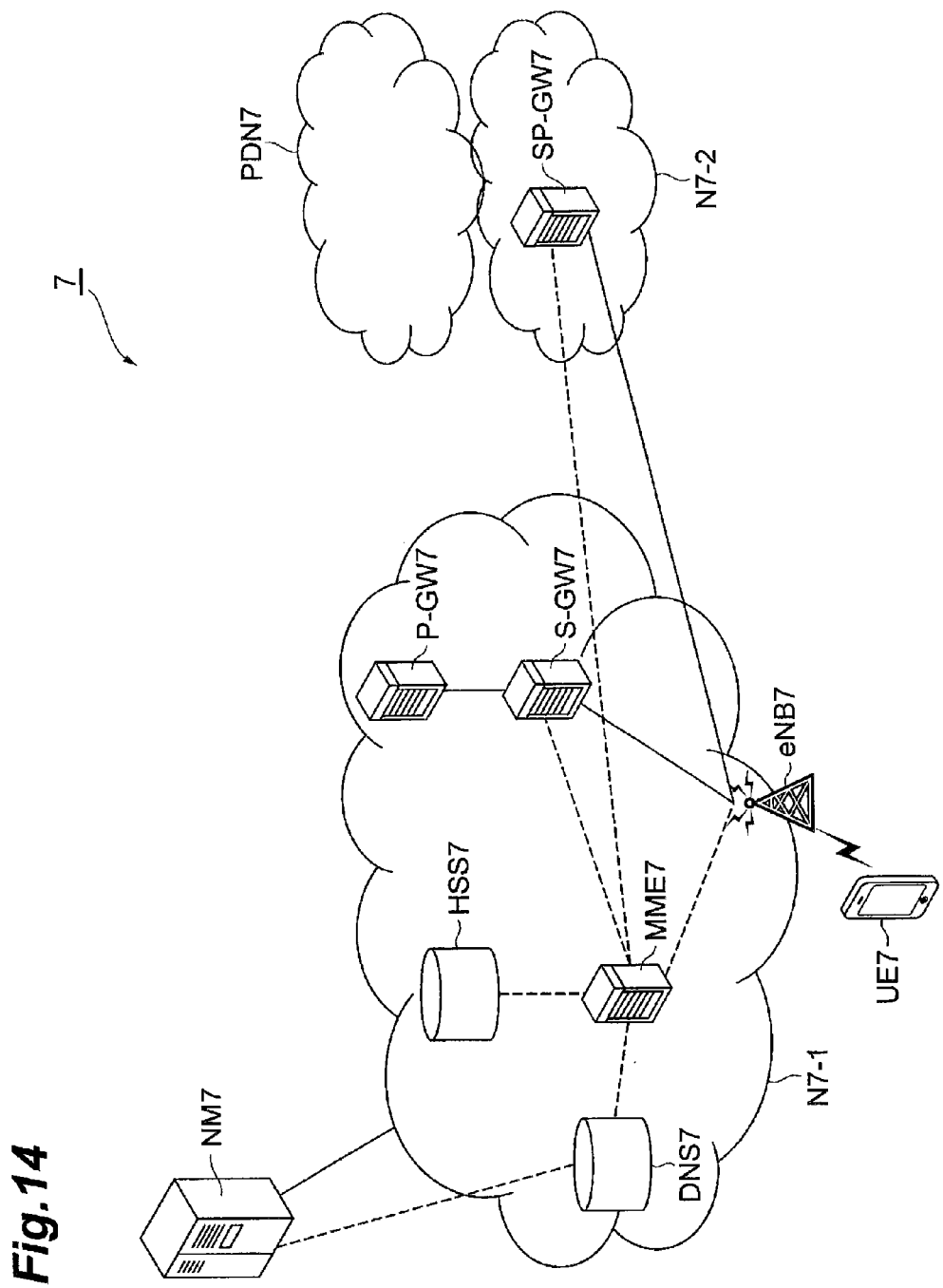
FIG. 14 is a diagram illustrating the structure of a mobile communication system according to a seventh embodiment of the invention.

Next, a mobile communication network distribution system and a mobile communication network distribution method according to a seventh embodiment will be described with reference to FIG. 14. FIG. 14 is a diagram illustrating the outline of a mobile communication system 7 according to the seventh embodiment. The mobile communication system 7 provides a mobile communication function to UE7 which is a mobile communication terminal. As shown in FIG. 14, the mobile communication system 7 includes UE7, N7-1 and N7-2 which are mobile communication networks, PDN7, and NM7 which is a network management control device. Here, N7-1 is a mobile communication network according to the related art which is defined by 3GPP and N7-2 is a degenerate mobile communication network which is a mobile communication network without a mobility management function of the mobile communication network according to the related art. In addition, N7-2 may be constructed by the server virtualization technique. N7-1 includes eNB7, MME7, HSS7, DNS7, S-GW7, and P-GW7. N7-2 includes SP-GW7 which is an apparatus or a node having only some of the functions of an S-GW and a P-GW. Here, NM7 is connected to N7-1. NM7 has a network node monitoring function of monitoring the congestion and failure of a node in N7-1. When it is determined that the provision of services is affected by the congestion or failure of a network node for a given period of time or more, NM7 determines to change the connection destination of UE7 from N7-1 to N7-2 for a specific service.

In the seventh embodiment, the mobile communication network distribution system corresponds to NM7. That is, NM7 includes an acquisition unit 11, a determination unit 12, and a distribution unit 13.

Next, a distribution process which is operatively associated with the network management control device in this embodiment will be described with reference to the mobile communication system 7 shown in FIG. 14. In the following distribution process which is operatively associated with the network management control device, process numbers are given in order of processes.

1. The acquisition unit 11 of NM7 acquires information indicating the communication quality of N7-1. Here, the determination unit 12 determines that the communication quality of N7-1 is less than a predetermined threshold value and determines the connection destination mobile communication network as N7-2 different from N7-1 on the basis of the determination result. Then, the distribution unit 13 of NM7 rewrites the address information of a DNS corresponding to PDN7 for connection to the PDN through a node of N7-2, thereby distributing the connection destination of UE7 to N7-2.

2. When communication with a specific PDN is not performed for a predetermined period of time or more, UE7 performs reattachment. Therefore, it is possible to achieve a connection to the PDN through N7-2 after reattachment.

Eighth Embodiment

Figure 15:
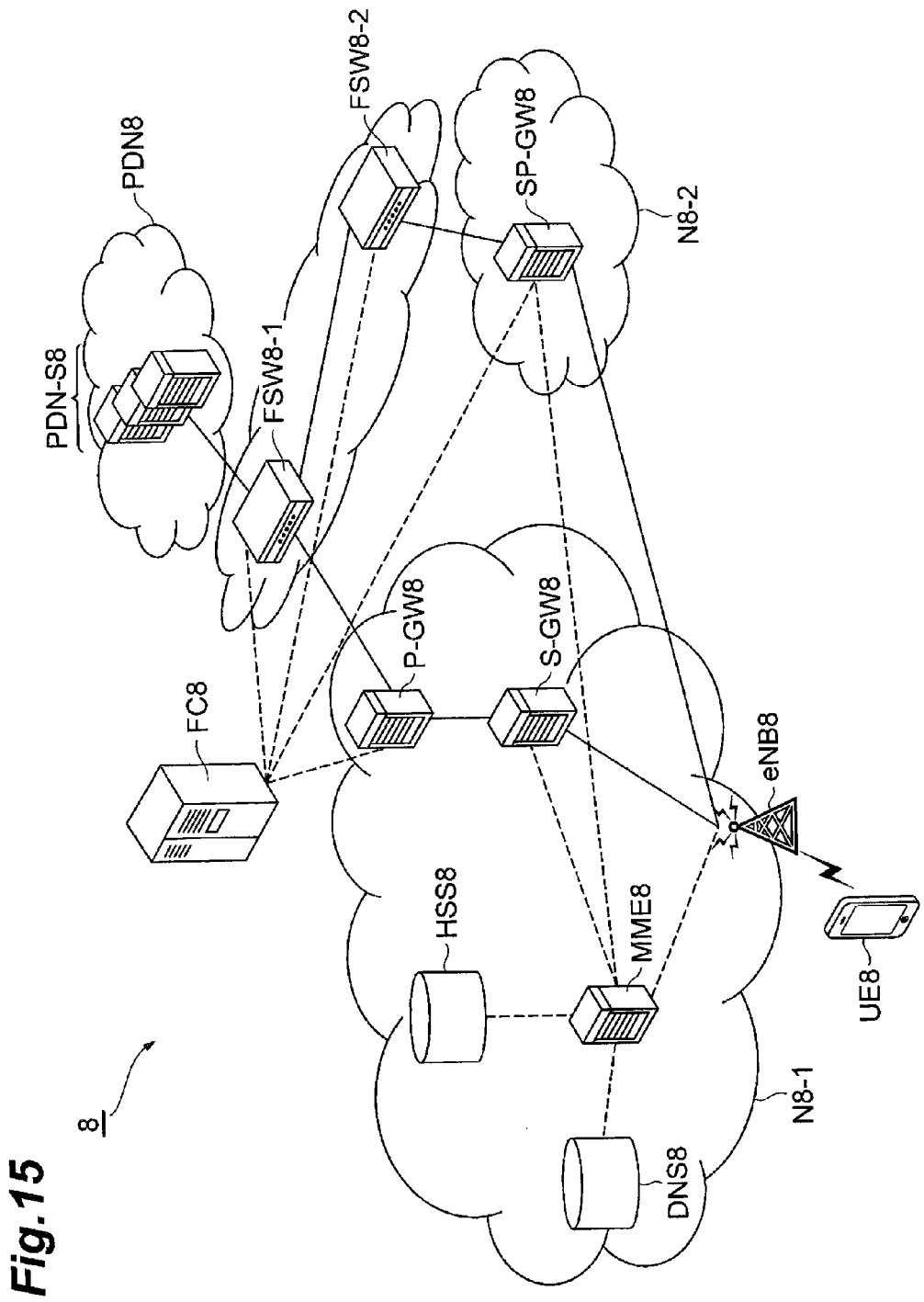
FIG. 15 is a diagram illustrating the structure of a mobile communication system according to an eighth embodiment of the invention.

Next, a mobile communication network distribution system and a mobile communication network distribution method according to an eighth embodiment will be described with reference to FIG. 15. FIG. 15 is a diagram illustrating the outline of a mobile communication system 8 according to the eighth embodiment. The mobile communication system 8 provides a mobile communication function to UE8 which is a mobile communication terminal. As shown in FIG. 15, the mobile communication system 8 includes UE8, N8-1 and N8-2 which are mobile communication networks, PDN8, an FC8 which is a flow control device, and FSW8-1 and FSW8-2 which are flow switches. Here, N8-1 is a mobile communication network according to the related art which is defined by 3GPP and N8-2 is a degenerate mobile communication network which is a mobile communication network without a mobility management function of the mobile communication network according to the related art. In addition, N8-2 may be constructed by the server virtualization technique. N8-1 includes eNB8, MME8, HSS8, DNS8, S-GW8, and P-GW8. N8-2 includes SP-GW8 which is an apparatus or a node having only some of the functions of an S-GW and a P-GW. PDN8 includes PDN-S8 which is a PDN server group. As shown in FIG. 15, the mobile communication system 8 has a structure in which P-GW8 and SP-GW8 are connected to common PDN8 through a network formed by an OpenFlow switch. This embodiment can also be applied to the mobile communication systems 5 to 7 according to the fifth to seventh embodiments.

Next, the procedure of a control operation of the flow switch in this embodiment will be described with reference to the mobile communication system 8 shown in FIG. 15. In the following procedure of the control operation of the flow switch, process numbers are given in order of processes.

1. First, when UE8 communicates with an arbitrary PDN server in PDN8 through N8-1, FC8 makes the table shown in FIG. 16. That is, at the same time as allocating the terminal address A of UE8 in response to an attachment signal from UE8, P-GW8 notifies FC8 that the address A has been allocated to UE8. Then, FC8 allocates, to new UE8, a new address C, which is an address as viewed from PDN8, and stores the relationship between the IMSI of UE8 and the addresses A and C. In addition, FC8 sets FSW8-1 having a connection port with P-GW8 that manages the address A such that the packet which has been transmitted from a terminal A and then input from the connection port with P-GW8 is output to a port to which PDN8 is connected. At the same time, FC8 rewrites the address A of the transmission source to the address C. FC8 sets a flow table in a direction from PDN8 to P-GW8 which is opposite to the above-mentioned flow direction, using the same method as described above.

2. Then, SP-GW8 allocates a terminal address B to UE8 in response to an attachment signal for switching to N8-2. At the same time, SP-GW8 notifies FC8 that the address B has been allocated to UE8. FC8 recognizes that the IMSI of the UE8 is related to the addresses A and C from a search and instructs FSW8-1 having the connection port with P-GW8, which manages the address A, to update the table to the settings of the table shown in FIG. 17(b). In addition, FC8 instructs FSW8-2 having a connection port with SP-GW8, which manages the address B, to set the table shown in FIG. 17(a).

3. When P-GW8 and SP-GW8 open the IP address of UE8 in response to the detachment signal, they notify that the address of UE8 has been opened for flow control. FC8 deletes the flow control table when the opened terminal address of UE8 is present after a predetermined timer process is performed, considering that the detachment/attachment processes are continuously performed for switching between P-GW8 and SP-GW8.

Figure 18:
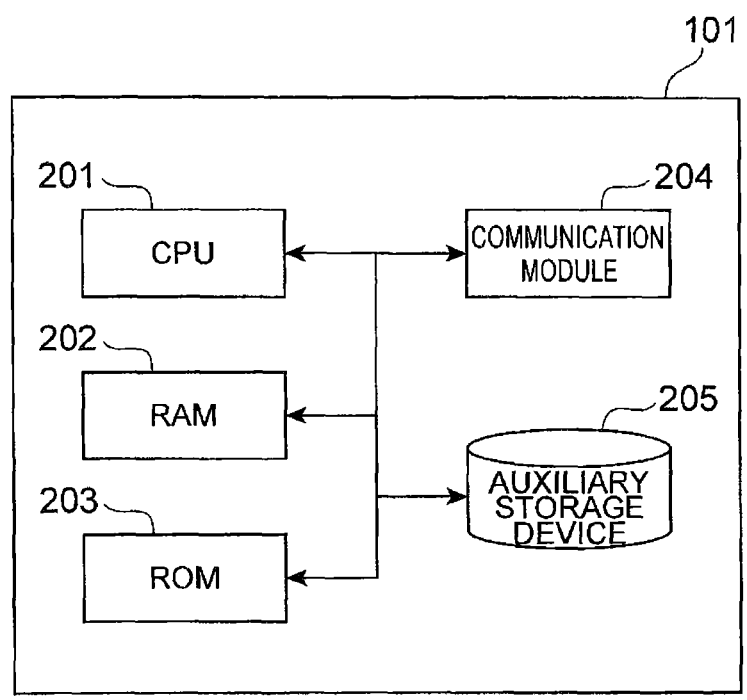
FIG. 18 is a diagram illustrating the hardware configuration of an apparatus forming a mobile communication network distribution system according to an embodiment of the invention.

FIG. 18 shows the hardware configuration of the server apparatus forming the mobile communication network distribution system 101 (including, for example, an HSS, an MME, an eNB, a flow switch, and a network management control device) according to this embodiment. As shown in FIG. 18, the server apparatus includes a computer having, for example, the following hardware components: a CPU 201; a random access memory (RAM) 202 and a read only memory (ROM) 203 which are main storage devices; a communication module 204 for performing communication; and an auxiliary storage device 205 such as a hard disk. These components are operated by, for example, a program to implement the functions of the mobile communication network distribution system 101.

In the above-described first to eighth embodiments, the LTE system has been described as the mobile communication system. However, the mobile communication network distribution system and the mobile communication network distribution method can be similarly applied to Wideband Code Division Multiple Access (W-CDMA)/High Speed Packet Access (HSPA). In addition, in each embodiment, the second network has been described as a network without a charging function or a mobility management function. However, the second network may be provided as a network with processes which correspond to the characteristics of the UE to be distributed and are different from those of the mobile communication network according to the related art (for example, a network which supports a protocol different from the 3GPP routing process according to the related art (for example, a protocol suitable for multi-cast, content distribution, a sensor network, or a smart grid)). Here, the network with the processes different from those of the mobile communication network according to the related art means a network obtained by replacing some of the functions of the general mobile communication network or a network having new added functions (other mobile communication networks mean mobile communication networks with some different functions). The network obtained by replacing some functions means a network obtained by changing, for example, a packet routing protocol from a "GTP tunneling protocol" according to the related art to a "flexible flow controllable protocol" or a network which has a "packet data processing function" or an "information storage function". An example of the network having the processes different from those of the mobile communication network according to the related art is a network which has an independent protocol suitable for traffic of an individual specific industry, such as environmental industry, educational industry, or medical industry, and an in-network processing function.

Figure 19:
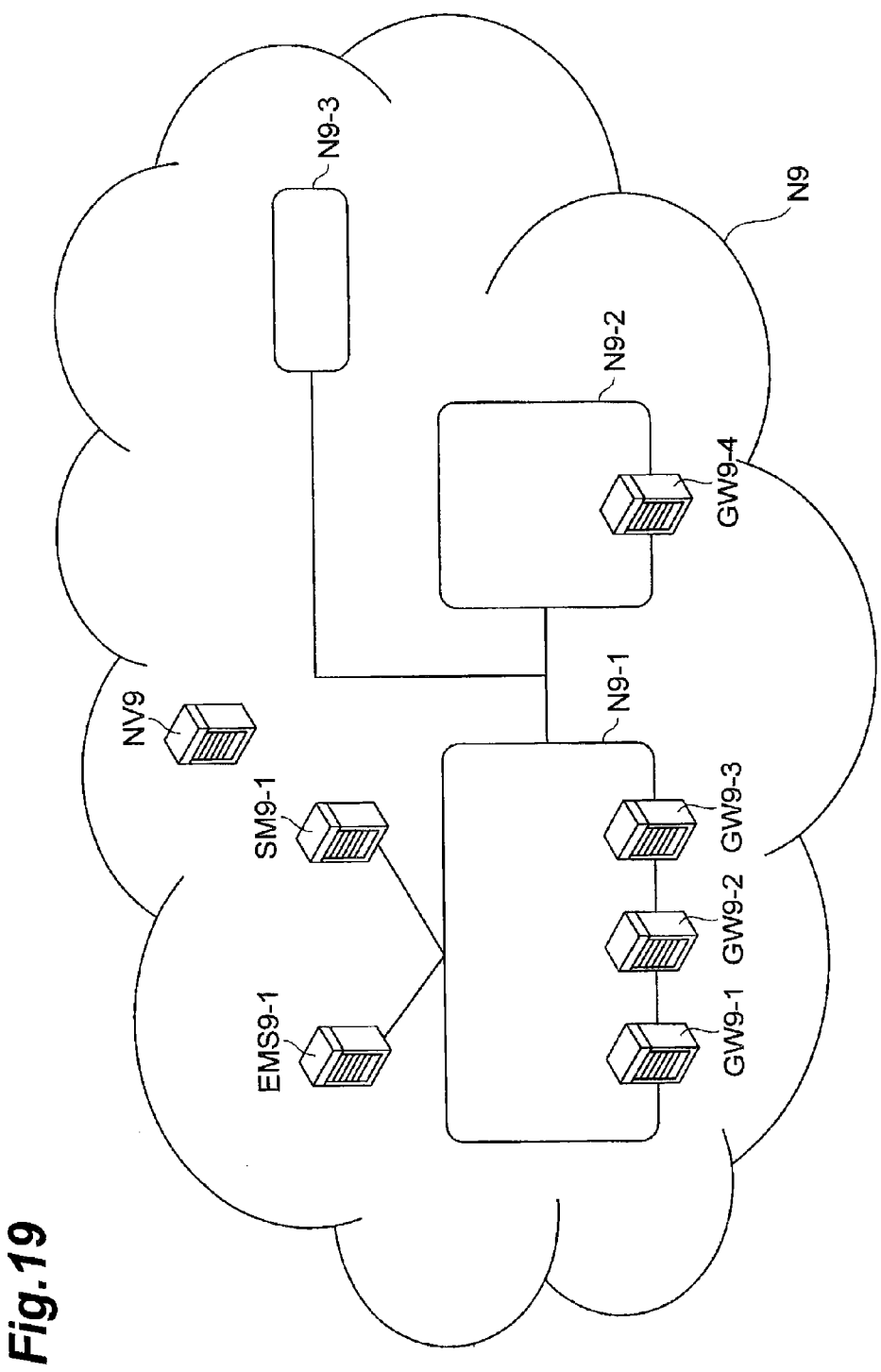
FIG. 19 is a diagram illustrating a smart grid network according to an embodiment of the invention.

FIG. 19 shows a smart grid network N9 which is an example of the structure of the network with processes different from those of the mobile communication network according to the related art. N9 is a network when a communication network in a smart grid field, which is a power grid capable of optimizing the flow control of power by both a supply side and a demand side, is provided as a virtual network. As shown in FIG. 19, N9 includes area networks N9-1 and N9-2, a nationwide relay network N9-3, EMS9-1 which is an energy management system (EMS) and consumer service platform, a power system management system SM9-1 which is an external system of an electric power company, and a network virtualization management server NV9. N9-1 includes GW9-1, GW9-2, and GW9-3 which are gateway apparatuses and N9-2 includes GW9-4 which is a gateway apparatus. EMS9-1 and SM9-1 are connected to N9-1 through a network. N9-1, N9-2, and N9-3 are connected to each other through a network. A consumer apparatus, such as a UE, or a sensor (for example, a house, an office, a factory, a distributed power generation system, a local-installation-type battery, and an electric vehicle (EV)) performs information communication with an apparatus, such as EMS9-1, through the apparatuses or networks included in N9.

N9 provides a service for processing packet data transmitted in the network or an information processing service in a providing server. In addition, N9 provides a service for storing data which is generated in association with the information processing service. Specifically, GW9-1, GW9-2, and GW9-3 provide a flexible flow control function which can flexibly transmit a large number of information packets generated from the consumer apparatus or the sensor according to the type of information or the degree of importance of information or can perform multi-casting with a small amount of delay on the control information packet from the server, such as EMS9-1. In some cases, data transmitted from the consumer includes personal information. In addition, N9 provides a packet data processing function, such as a privacy processing function, an information format processing function, a protocol processing function, and a distribution processing function for each EMS.

In addition, EMS9-1 manages and controls the supply and demand of energy. EMS9-1 can perform a demand prediction and calculation process to distribute some processes of each EMS to an edge node, considering a processing performance or efficiency. Then, EMS9-1 stores, for example, a history or statistical information. SM9-1 performs power system control. In addition, SM9-1 performs the demand prediction and calculation process to adjust the supply and demand of power between the area networks, to control power distribution, and to adjust the amount of power generated, such that a reverse power flow does not occur in the system. NV9 is connected to each apparatus included in N9 and forms and manages a virtual network in N9.

As described above, N9 is formed as a network which can provide a function of supporting a high-reliability transmission control suitable for collecting and controlling environmental information, a flexible information transmission function, and processing and storage functions in the network, which are different from the functions of the mobile communication network according to the related art. When the EMS is used to control the unbalance between the supply and demand of energy due to a change in electric power demand associated with the operation of the consumer over time, a change in the amount of power generated due to a change in the weather, and a change in the demand of power due to the movement of an EV, it is possible to dynamically respond to a change in the amount of necessary resources or an optimal provision place, using a network virtualization management server or a flexible flow control structure.

N9 can be replaced with N1-2 according to the first embodiment shown in FIG. 7, N2-2 according to the second embodiment shown in FIG. 9, N3-2 according to the third embodiment shown in FIG. 10, and N4-2 according to the fourth embodiment shown in FIG. 11. That is, in the first embodiment, HSS1 can distribute the connection destination to N1-1 or N9 (any one of GW9-1 to GW9-4). In the second embodiment, eNB2 can distribute the connection destination to N2-1 or N9 (any one of GW9-1 to GW9-4). In the third embodiment, eNB3 can distribute the connection destination to N3-1 or N9 (any one of GW9-1 to GW9-4). In the fourth embodiment, FSW4 can distribute the connection destination to N4-1 or N9 (any one of GW9-1 to GW9-4).

Next, an example of the conditions when the determination unit 12 determines N9 to be the connection destination mobile communication network in each of the above-described embodiments will be described. For example, when it is determined that the information indicating the terminal type of UE acquired by the acquisition unit 11 is the IMSI or IMEI of the UE (a ubiquitous module or a telematics module) which is incorporated and mounted to a sensor, an energy apparatus, or an EV (on the basis of, for example, a correspondence table which is stored in the apparatus in advance), the determination unit 12 determines N9 to be the connection destination mobile communication network (on the basis of, for example, a termination table which is stored in the apparatus in advance). For example, when it is determined that the information indicating the content of the contract of the UE in the mobile communication system acquired by the acquisition unit 11 is contract type information indicating that the contract service of the mobile communication terminal is a specific machine-machine communication service and processes different from those of the mobile communication network according to the related art are determined to be needed in advance (on the basis of, for example, the correspondence table which is stored in the apparatus in advance), the determination unit 12 determines N9 to be the connection destination mobile communication network (on the basis of, for example, the termination table which is stored in the apparatus in advance).

For example, when it is determined that the information indicating the content of the services which the UE requests from the mobile communication system, which is acquired by the acquisition unit 11, is information indicating a request for flexible flow control from the mobile communication system, information indicating a request for a packet data processing function from the mobile communication system, or information indicating a request for an information storage function, such as a history storage function or a statistical information storage function, from the mobile communication system (on the basis of, for example, the correspondence table which is stored in the apparatus in advance), the determination unit 12 determines N9 to be the connection destination mobile communication network (on the basis of, for example, the termination table which is stored in the apparatus in advance).

As described above, the mobile communication network distribution system 101 distributes N9 as the connection destination mobile communication network. Therefore, it is possible to perform the process or flow control which cannot be provided by the network according to the related art and to achieve a smart grid service. Specifically, it is possible to provide a service for processing packet data transmitted in the network or an information processing service in the providing server. In addition, it is possible to provide a service for storing data which is generated in association with the information processing service. It is possible to flexibly transmit a large number of information packets generated from a consumer apparatus or a sensor according to the type of information or the degree of importance of information, or to perform multi-casting with a small amount of delay on the control information packet from a server, such as EMS. In some cases, data transmitted from the consumer includes personal information. It is possible to support a security function or to provide a protocol or a process suitable for reliably transmitting signals.

As described above, in the mobile communication network distribution system 101 according to this embodiment, the acquisition unit 11 acquires condition information including at least one of information indicating the terminal type of the UE 102, information indicating the content of the contract of the UE in the mobile communication system 100, information indicating the moving state of the UE 102, information indicating the content of the services which the UE 102 requests from the mobile communication system 100, and information indicating the communication quality of the mobile communication network included in the mobile communication system 100. Then, the determination unit 12 determines the degenerate mobile communication network 104 which provides the function based on the acquired condition information among a plurality of mobile communication networks to be the connection destination mobile communication network which is the connection destination of the UE 102. Then, the distribution unit 13 distributes the connection destination of the UE 102 to the determined connection destination mobile communication network. Therefore, the degenerate mobile communication network 104 which provides limited functions and has high cost efficiency is prepared and it is possible to distribute the connection destination of the UE 102 to the degenerate mobile communication network 104 on the basis of the condition information. Thus, for example, it is possible to prevent excessive processing capability from being provided to the mobile communication network resources. As a result, facility utilization efficiency is improved and it is possible to suppress an increase in mobile communication network costs or service provision costs. That is, it is possible to provide communication services with high utilization efficiency and high cost efficiency.

In the related art, when one control network manages various types of terminals or various services, complexity increases. For example, the number of types of nodes in the network increases, control for the connection between the nodes is complicated, and the processing branch or contention control of a service processing application in each node is complicated. When a failure or congestion occurs in a portion of the node or network which processes a mixture of a plurality of services, all services from an important service to a service with a relatively low priority are affected by the failure or congestion and it is impossible to preferentially retrieve only the important services. In addition, the processes are further complicated in order to distinguish the services. In the mobile communication network distribution system 101 according to this embodiment, the connection destination of the UE 102 is distributed to one mobile communication network among a plurality of mobile communication networks. Therefore, for example, even when a failure or congestion occurs in some mobile communication networks, it is possible to ensure the availability of the services.

A plurality of mobile communication networks include the degenerate mobile communication network 104 without a mobility management function. When it is determined that the mobility management of the UE 102 is not required on the basis of the condition information acquired by the acquisition unit 11, the determination unit 12 may determine the degenerate mobile communication network 104 without a mobility management function to be the connection destination mobile communication network. According to this structure, since the connection destination of the UE 102 can be distributed to the degenerate mobile communication network 104 without a mobility management function, it is possible to provide a communication service with high utilization efficiency and high cost efficiency.

A plurality of mobile communication networks include the degenerate mobile communication network 104 without a position management function. When it is determined that the position management of the UE 102 is not required on the basis of the condition information acquired by the acquisition unit 11, the determination unit 12 may determine the degenerate mobile communication network 104 without a position management function to be the connection destination mobile communication network. According to this structure, since the connection destination of the UE 102 can be distributed to the degenerate mobile communication network 104 without a position management function, it is possible to provide a communication service with high utilization efficiency and high cost efficiency.

A plurality of mobile communication networks includes the degenerate mobile communication network 104 without a charging management function. When it is determined that the charging management of the UE 102 is not required on the basis of the condition information acquired by the acquisition unit 11, the determination unit 12 may determine the degenerate mobile communication network 104 without a charging management function to be the connection destination mobile communication network. According to this structure, since the connection destination of the UE 102 can be distributed to the degenerate mobile communication network 104 without a charging management function, it is possible to provide a communication service with high utilization efficiency and cost efficiency.

The mobile communication network distribution system further includes the location history storage unit 14 that stores the history of the location information related to the location area of the UE 102. The determination unit 12 may determine whether the mobility management of the UE 102 is not (temporarily) required on the basis of the history of the location information stored in the location history storage unit 14. According to this structure, it is possible to accurately suppose the moving state of the UE 102 on the basis of the history of the location information related to the location area of the UE 102. Therefore, it is possible to appropriately distribute the connection destination of the UE 102 to the degenerate mobile communication network 104 without a mobility management function. As a result, it is possible to provide a communication service with high utilization efficiency and cost efficiency.

The mobile communication network included in a plurality of mobile communication networks may be constructed by the server virtualization technique. In the related art, for example, a dedicated hardware device is provided for each application for processing the communication service. Therefore, when a dedicated network which is customized for each UE 102 or each service type is constructed even though each UE 102 or each service type requires different functions, the size of the network is not sufficient, which is not appropriate in terms of costs and causes disadvantages due to division loss. In contrast, according to the above-mentioned structure, the virtualization technique is applied to operate an application for processing the communication service on a general-purpose server and to construct the individual degenerate mobile communication network 104 with a size suitable for each UE 102 or each service type. Therefore, it is possible to prevent the complexity of the network, unlike the related art, and to flexibly provide the availability of services according to the degree of importance. In addition, the application function of the communication service is customized to each terminal or each service type to remove a redundant process. Therefore, it is possible to provide a communication service with high utilization efficiency and cost efficiency. In addition, it is possible to dynamically install the system in a necessary place or to perform scaling according to the number of subscribers or the throughput of the service request which varies over time.

In the mobile communication network distribution system 101 according to this embodiment, for example, a plurality of networks which are customized according to service conditions are prepared, in addition to one network with the mobile communication function according to the related art and the network can be distributed as described above to provide services. For example, it is possible to distribute the UE to an inexpensive network with a necessary communication service function, according to the subscription type of UE and the type of requested services. In addition, it is possible to distribute the UE to a network according to the state of the UE. For example, it is possible to distribute the UE to a conventional network while the user is moving and to distribute the UE to a simple network without a mobility management function (mobility function) when the user stays at a home or an office. In addition, for example, when a failure occurs in the first network and it is impossible to use the first network, it is possible to distribute some important services to the second network.

REFERENCE SIGNS LIST

100: MOBILE COMMUNICATION SYSTEM
11: ACQUISITION UNIT
12: DETERMINATION UNIT

13: DISTRIBUTION UNIT
14: LOCATION HISTORY STORAGE UNIT
101: MOBILE COMMUNICATION NETWORK DISTRIBUTION SYSTEM
102: UE
103: MOBILE COMMUNICATION NETWORK
104: DEGENERATE MOBILE COMMUNICATION NETWORK
201: CPU
202: RAM
203: ROM
204: COMMUNICATION MODULE
205: AUXILIARY STORAGE DEVICE

The invention claimed is:

1. A mobile communication network distribution system provided in a mobile communication system that includes a plurality of mobile communication networks including a mobile communication network providing a function satisfying functional requirements that differs from another mobile communication network and a mobile communication terminal, the mobile communication network distribution system comprising:
circuitry configured to:
acquire condition information including at least one of information indicating a type of the mobile communication terminal, information indicating the content of a contract of the mobile communication terminal in the mobile communication system, information indicating a moving state of the mobile communication terminal, information indicating the content of a service which the mobile communication terminal requests from the mobile communication system, and information indicating a communication quality of the mobile communication network included in the mobile communication system;
determine a mobile communication network that provides a function satisfying functional requirements based on the acquired condition information among the plurality of mobile communication networks to be a connection destination mobile communication network which is a connection destination of the mobile communication terminal;
distribute the connection destination of the mobile communication terminal to the determined connection destination mobile communication network, wherein
the plurality of mobile communication networks further includes a degenerate mobile communication network which is a mobile communication network that provides limited functions,
each mobile communication network of the plurality of mobile communication networks comprises a network gateway apparatus,
the each mobile communication network is constructed by a server virtualization technique that is applied to operate an application for processing a communication service on servers and to construct an individual mobile communication network for at least one of each service type and a size of the each service type, and
the individual mobile communication network for the at least one of each service type and the size is selected among the plurality of mobile communication networks; and
determine the degenerate mobile communication network that provides the function based on the acquired condition information among the plurality of mobile communication networks to be the connection destination mobile communication network.

2. The mobile communication network distribution system according to claim 1, wherein
the plurality of mobile communication networks include a degenerate mobile communication network without a mobility management function, and
when it is determined that mobility management of the mobile communication terminal is not required on the basis of the acquired condition information, the circuitry is further configured to determine the degenerate mobile communication network without the mobility management function to be the connection destination mobile communication network.

3. The mobile communication network distribution system according to claim 1, wherein
the plurality of mobile communication networks include a degenerate mobile communication network without a position management function, and
when it is determined that position management of the mobile communication terminal is not required on the basis of the acquired condition information, the circuitry is further configured to determine the degenerate mobile communication network without the position management function to be the connection destination mobile communication network.

4. The mobile communication network distribution system according to claim 1, wherein
the plurality of mobile communication networks include a degenerate mobile communication network without a charging management function, and
when it is determined that charging management of the mobile communication terminal is not required on the basis of the acquired condition information, the circuitry IS further configured to determine the degenerate mobile communication network without the charging management function to be the connection destination mobile communication network.

5. The mobile communication network distribution system according to claim 2, the circuitry further configured to:
store a history of location information related to a location area of the mobile communication terminal, and
determine whether the mobility management of the mobile communication terminal is not required on the basis of the history of the stored location information.

6. A mobile communication network distribution method that is performed by a mobile communication network distribution system provided in a mobile communication system that includes a plurality of mobile communication networks including a mobile communication network providing a function satisfying functional requirements that differs from another mobile communication network and a mobile communication terminal, the mobile communication network distribution method comprising:
an acquisition step of acquiring condition information including at least one of information indicating a type of the mobile communication terminal, information indicating the content of a contract of the mobile communication terminal in the mobile communication system, information indicating a moving state of the mobile communication terminal, information indicating the content of a service which the mobile communication terminal requests from the mobile communication system, and information indicating a communication quality of the mobile communication network included in the mobile communication system;

a determination step of determining a mobile communication network that provides a function satisfying functional requirements based on the condition information acquired in the acquisition step among the plurality of mobile communication networks to be a connection destination mobile communication network which is a connection destination of the mobile communication terminal;

a distribution step of distributing the connection destination of the mobile communication terminal to the connection destination mobile communication network determined in the determination step, wherein the plurality of mobile communication networks further includes a degenerate mobile communication network which is a mobile communication network that provides limited functions, each mobile communication network of the plurality of mobile communication networks comprises a network gateway apparatus, the each mobile communication network is constructed by a server virtualization technique that is applied to operate an application for processing a communication service on servers and to construct an individual mobile communication network for at least one of each service type and a size of the each service type, and the individual mobile communication network for the at least one of each service type and the size is selected among the plurality of mobile communication networks; and determine the degenerate mobile communication network that provides the function based on the acquired condition information among the plurality of mobile communication networks to be the connection destination mobile communication network.

7. A mobile communication network distribution method that is performed by a mobile communication network distribution system provided in a mobile communication system that includes a plurality of mobile communication networks including a mobile communication network providing a function satisfying functional requirements that differs from another mobile communication network and a mobile communication terminal, the mobile communication network distribution method comprising:

an acquisition step of acquiring condition information including at least one of information indicating a type of the mobile communication terminal, information indicating the content of a contract of the mobile communication terminal in the mobile communication system, information indicating a moving state of the mobile communication terminal, information indicating the content of a service which the mobile communication terminal requests from the mobile communication system, and information indicating a communication quality of the mobile communication network included in the mobile communication system;

a determination step of determining a mobile communication network that provides a function satisfying functional requirements based on the condition information acquired in the acquisition step among the plurality of mobile communication networks to be a connection destination mobile communication network which is a connection destination of the mobile communication terminal;

a distribution step of distributing the connection destination of the mobile communication terminal to the connection destination mobile communication network determined in the determination step, wherein the plurality of mobile communication networks further includes a degenerate mobile communication network which is a mobile communication network that provides limited functions, each mobile communication network of the plurality of mobile communication networks comprises a network gateway apparatus, the each mobile communication network is constructed by a server virtualization technique that is applied to operate an application for processing a communication service on servers and to construct an individual mobile communication network for at least one of each mobile communication terminal type and a size of the each mobile communication terminal type, and the individual mobile communication network for the at least one of each mobile communication terminal type and the size is selected among the plurality of mobile communication networks; and determine the degenerate mobile communication network that provides the function based on the acquired condition information among the plurality of mobile communication networks to be the connection destination mobile communication network.

* * * * *